United States Patent
Kindler et al.

(10) Patent No.: US 8,233,217 B2
(45) Date of Patent: Jul. 31, 2012

(54) MULTILAYERED FLUORESCENT SCREENS FOR SCANNING BEAM DISPLAY SYSTEMS

(75) Inventors: David Kindler, Concord, MA (US); Sergey A. Bukesov, Acton, MA (US); Roger A. Hajjar, San Jose, CA (US); Amit Jain, Saratoga, CA (US); David L. Kent, Framingham, MA (US); Phillip H. Malyak, Canton, MA (US); Brian Massey, Marlborough, MA (US); John Ritter, Harvard, MA (US); John Uebbing, Palo Alto, CA (US)

(73) Assignee: Prysm, Inc., San Jose, CA (US)

( * ) Notice: Subject to any disclaimer, the term of this patent is extended or adjusted under 35 U.S.C. 154(b) by 0 days.

(21) Appl. No.: 13/078,859

(22) Filed: Apr. 1, 2011

(65) Prior Publication Data
US 2011/0176208 A1     Jul. 21, 2011

Related U.S. Application Data

(62) Division of application No. 11/514,720, filed on Aug. 31, 2006, now Pat. No. 8,000,005.

(60) Provisional application No. 60/800,870, filed on May 15, 2006.

(51) Int. Cl.
*G03B 21/56* (2006.01)
(52) U.S. Cl. ............. 359/443; 353/29; 353/122; 345/84
(58) Field of Classification Search ................... 359/443, 359/449; 353/29, 122; 345/84
See application file for complete search history.

(56) References Cited

U.S. PATENT DOCUMENTS

| | | | |
|---|---|---|---|
| 2,439,181 A | 5/1946 | Nicoll | |
| 3,025,161 A | 3/1962 | Thaddeus | |
| 3,556,637 A | 1/1971 | Palmquist | |
| 3,624,273 A * | 11/1971 | Gale | 348/796 |
| 3,652,956 A | 3/1972 | Pinnow et al. | |
| 3,691,482 A | 9/1972 | Pinnow et al. | |
| 3,736,050 A * | 5/1973 | Bolum | 359/890 |
| 3,750,189 A | 7/1973 | Fleischer | |
| 3,868,167 A | 2/1975 | Schreiber | |
| 4,165,154 A | 8/1979 | Takahashi | |
| 4,166,233 A | 8/1979 | Stanley | |
| 4,295,093 A | 10/1981 | Middleton | |
| 4,305,646 A | 12/1981 | Bechtold | |

(Continued)

FOREIGN PATENT DOCUMENTS

DE        10044603        4/2001

(Continued)

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

(Continued)

*Primary Examiner* — Christopher Mahoney
(74) *Attorney, Agent, or Firm* — Fish & Richardson P.C.

(57) ABSTRACT

Fluorescent screens and display systems and devices based on such screens using at least one excitation optical beam to excite one or more fluorescent materials on a screen which emit light to form images. The fluorescent materials may include phosphor materials and non-phosphor materials such as quantum dots.

17 Claims, 26 Drawing Sheets

U.S. PATENT DOCUMENTS

| | | | |
|---|---|---|---|
| 4,307,320 A | 12/1981 | Kotera et al. |
| 4,401,362 A | 8/1983 | Maeda |
| 4,512,911 A | 4/1985 | Kotera et al. |
| 4,613,201 A | 9/1986 | Shortle et al. |
| 4,624,528 A | 11/1986 | Brueggemann |
| 4,661,419 A | 4/1987 | Nakamura |
| 4,707,093 A | 11/1987 | Testa |
| 4,713,577 A | 12/1987 | Gualtieri et al. |
| 4,737,840 A | 4/1988 | Morishita |
| 4,799,050 A | 1/1989 | Prince et al. |
| 4,808,804 A | 2/1989 | Krichever et al. |
| 4,816,920 A | 3/1989 | Paulsen |
| 4,872,750 A | 10/1989 | Morishita |
| 4,897,715 A | 1/1990 | Beamon |
| 4,923,262 A | 5/1990 | Clay |
| 4,932,734 A | 6/1990 | Sakuma et al. |
| 4,978,202 A | 12/1990 | Yang |
| 4,979,030 A | 12/1990 | Murata |
| 5,054,866 A | 10/1991 | Tomita et al. |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,136,426 A | 8/1992 | Linden et al. |
| 5,138,441 A | 8/1992 | Tanaka |
| 5,140,604 A | 8/1992 | Alablanche et al. |
| 5,146,355 A * | 9/1992 | Prince et al. | 349/71 |
| 5,166,944 A | 11/1992 | Conemac |
| 5,170,181 A | 12/1992 | Tamada |
| 5,175,637 A | 12/1992 | Jones et al. |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,296,922 A | 3/1994 | Mitani et al. |
| 5,365,288 A | 11/1994 | Dewald et al. |
| 5,389,324 A | 2/1995 | Lewis et al. |
| 5,414,521 A | 5/1995 | Ansley |
| 5,422,693 A | 6/1995 | Vogeley et al. |
| 5,442,254 A | 8/1995 | Jaskie |
| 5,473,396 A | 12/1995 | Okajima et al. |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,521,986 A | 5/1996 | Curtin, II et al. |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,693,254 A * | 12/1997 | Sieber et al. | 252/301.4 H |
| 5,698,857 A | 12/1997 | Lambert et al. |
| 5,715,021 A | 2/1998 | Gibeau et al. |
| 5,716,118 A | 2/1998 | Sato et al. |
| 5,870,224 A | 2/1999 | Saitoh et al. |
| 5,882,774 A | 3/1999 | Jonza et al. |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,918 A | 12/1999 | Do et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,069,599 A | 5/2000 | Py et al. |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker |
| 6,226,126 B1 | 5/2001 | Conemac |
| 6,236,160 B1 * | 5/2001 | Komaki et al. | 313/586 |
| 6,252,254 B1 | 6/2001 | Soules et al. |
| 6,255,670 B1 | 7/2001 | Srivastava et al. |
| 6,276,802 B1 | 8/2001 | Naito |
| 6,288,817 B2 | 9/2001 | Rowe |
| 6,292,285 B1 | 9/2001 | Wang et al. |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,429,584 B2 | 8/2002 | Kubota |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,785,028 B1 | 8/2004 | Atsuumi et al. |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,956,684 B2 | 10/2005 | Orcutt |
| 6,986,581 B2 | 1/2006 | Sun et al. |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,147,802 B2 | 12/2006 | Sugimoto et al. |
| 7,181,417 B1 | 2/2007 | Langseth et al. |
| 7,206,041 B2 | 4/2007 | Kashima |
| 7,213,923 B2 | 5/2007 | Liu et al. |
| 7,230,767 B2 | 6/2007 | Walck et al. |
| 7,239,436 B2 | 7/2007 | Orttinger et al. |
| 7,283,301 B2 | 10/2007 | Peeters et al. |
| 7,302,174 B2 | 11/2007 | Tan et al. |
| 7,357,512 B2 * | 4/2008 | Tan et al. | 353/31 |
| 7,474,286 B2 | 1/2009 | Hajjar et al. |
| 7,697,183 B2 | 4/2010 | Malyak et al. |
| 7,728,845 B2 | 6/2010 | Holub |
| 7,994,702 B2 | 8/2011 | Bukesov et al. | 313/498 |
| 8,000,005 B2 | 8/2011 | Kindler et al. | 359/443 |
| 2001/0019240 A1 | 9/2001 | Takahashi |
| 2001/0024086 A1 | 9/2001 | Fox et al. |
| 2001/0050371 A1 | 12/2001 | Odaki et al. |
| 2001/0054871 A1 * | 12/2001 | Tadaki et al. | 313/586 |
| 2002/0003233 A1 | 1/2002 | Mueller-Mach et al. |
| 2002/0008854 A1 | 1/2002 | Leigh |
| 2002/0024495 A1 | 2/2002 | Lippert et al. |
| 2002/0050963 A1 | 5/2002 | Conemac et al. |

| | | | | | | |
|---|---|---|---|---|---|---|
| 2002/0122260 | A1 | 9/2002 | Okazaki et al. | JP | 2-199975 | 8/1990 |
| 2002/0124250 | A1 | 9/2002 | Proehl et al. | JP | 5232583 | 9/1993 |
| 2002/0139945 | A1 | 10/2002 | Takahashi et al. | JP | 6-46461 | 2/1994 |
| 2002/0145685 | A1 | 10/2002 | Mueller-Mach et al. | JP | 9114397 A | 5/1997 |
| 2002/0163702 | A1 | 11/2002 | Hori et al. | JP | 2000-49380 | 2/2000 |
| 2002/0185965 | A1 | 12/2002 | Collins et al. | JP | 2001-210122 | 8/2001 |
| 2003/0094893 | A1 | 5/2003 | Ellens et al. | JP | 2001-316664 | 11/2001 |
| 2003/0184209 | A1 | 10/2003 | Russ et al. | JP | 2002-83549 | 3/2002 |
| 2003/0184531 | A1 | 10/2003 | Morikawa et al. | JP | 2005181831 A | 7/2005 |
| 2003/0184613 | A1 | 10/2003 | Nakamura et al. | JP | 2008-509067 | 3/2008 |
| 2003/0184842 | A1 | 10/2003 | Morikawa et al. | KR | 10-2001-0097415 | 11/2001 |
| 2003/0231161 | A1 | 12/2003 | Yamaguchi | KR | 2002-0024425 | 3/2002 |
| 2004/0027465 | A1 | 2/2004 | Smith et al. | KR | 2003-0068589 | 8/2003 |
| 2004/0070551 | A1 | 4/2004 | Walck et al. | KR | 2004-0037267 | 5/2004 |
| 2004/0136204 | A1 | 7/2004 | Asao | WO | WO 90/12387 | 10/1990 |
| 2004/0141220 | A1 | 7/2004 | Hama et al. | WO | WO 92/22109 | 12/1992 |
| 2004/0145312 | A1 | 7/2004 | Ouderkirk et al. | WO | WO 00/20912 | 4/2000 |
| 2004/0156079 | A1 | 8/2004 | Marshall et al. | WO | WO 00/33389 | 6/2000 |
| 2004/0160516 | A1 | 8/2004 | Ford | WO | WO 01/24229 | 4/2001 |
| 2004/0164927 | A1 | 8/2004 | Suyama et al. | WO | WO 01/88609 | 11/2001 |
| 2004/0165642 | A1 | 8/2004 | Lamont | WO | WO 02/11173 | 2/2002 |
| 2004/0184123 | A1 | 9/2004 | Morikawa et al. | WO | WO 02/23962 | 3/2002 |
| 2004/0223100 | A1 | 11/2004 | Kotchick et al. | WO | WO 02/29772 A2 | 4/2002 |
| 2004/0227465 | A1 | 11/2004 | Menkara et al. | WO | WO 02/33970 | 4/2002 |
| 2004/0263074 | A1 | 12/2004 | Baroky et al. | WO | WO 02/057838 | 7/2002 |
| 2005/0001225 | A1 | 1/2005 | Yoshimura et al. | WO | WO 02/059693 A1 | 8/2002 |
| 2005/0012446 | A1 | 1/2005 | Jermann et al. | WO | WO 02/071148 | 9/2002 |
| 2005/0023962 | A1 | 2/2005 | Menkara et al. | WO | WO2004003880 | 1/2004 |
| 2005/0023963 | A1 | 2/2005 | Menkara et al. | WO | WO 2005/043232 A2 | 5/2005 |
| 2005/0051790 | A1 | 3/2005 | Ueda | WO | WO 2005/119797 | 12/2005 |
| 2005/0093818 | A1 | 5/2005 | Hatam-Tabrizi et al. | WO | WO 2006/097876 | 9/2006 |
| 2005/0094266 | A1 | 5/2005 | Liu et al. | WO | WO 2007/050662 | 5/2007 |
| 2006/0050015 | A1 | 3/2006 | Kusunoki et al. | WO | WO 2007/095329 | 8/2007 |
| 2006/0066508 | A1 | 3/2006 | Walck et al. | WO | WO 2007/114918 | 10/2007 |
| 2006/0081793 | A1 | 4/2006 | Nestorovic et al. | WO | WO 2007/131195 | 11/2007 |
| 2006/0082873 | A1 | 4/2006 | Allen et al. | WO | WO 2007/134329 | 11/2007 |
| 2006/0088951 | A1 | 4/2006 | Hayashi et al. | WO | WO 2008/116123 | 9/2008 |
| 2006/0132021 | A1 | 6/2006 | Naberhuis et al. | WO | WO 2008/124707 | 10/2008 |
| 2006/0139580 | A1 | 6/2006 | Conner | WO | WO 2008/144673 | 11/2008 |
| 2006/0197922 | A1 | 9/2006 | Liu et al. | WO | WO 2009/003192 | 12/2008 |
| 2006/0221021 | A1 | 10/2006 | Hajjar et al. | | | |
| 2006/0221022 | A1 | 10/2006 | Hajjar | | | |
| 2006/0227087 | A1 | 10/2006 | Hajjar et al. | | | |
| 2006/0262243 | A1 | 11/2006 | Lester et al. | | | |
| 2006/0266958 | A1 | 11/2006 | Shimizu et al. | | | |
| 2006/0290898 | A1 | 12/2006 | Liu et al. | | | |
| 2007/0014318 | A1 | 1/2007 | Hajjar et al. | | | |
| 2007/0081239 | A1 | 4/2007 | May et al. | | | |
| 2007/0085977 | A1 | 4/2007 | Fricke et al. | | | |
| 2007/0183466 | A1 | 8/2007 | Son et al. | | | |
| 2007/0187580 | A1 | 8/2007 | Kykta et al. | | | |
| 2007/0187616 | A1 | 8/2007 | Burroughs et al. | | | |
| 2007/0188417 | A1 | 8/2007 | Hajjar et al. | | | |
| 2007/0206258 | A1 | 9/2007 | Malyak et al. | | | |
| 2007/0228927 | A1 | 10/2007 | Kindler et al. | | | |
| 2007/0229946 | A1 | 10/2007 | Okada et al. | | | |
| 2008/0018558 | A1 | 1/2008 | Kykta et al. | | | |
| 2008/0066107 | A1 | 3/2008 | Moonka et al. | | | |
| 2008/0068295 | A1 | 3/2008 | Hajjar | | | |
| 2008/0235749 | A1 | 9/2008 | Jain et al. | | | |
| 2008/0247020 | A1 | 10/2008 | Malyak et al. | | | |
| 2008/0291140 | A1 | 11/2008 | Kent et al. | | | |
| 2009/0001272 | A1 | 1/2009 | Hajjar | | | |
| 2009/0021461 | A1 | 1/2009 | Hu et al. | | | |
| 2009/0116107 | A1 | 5/2009 | Kindler et al. | | | |
| 2009/0153582 | A1 | 6/2009 | Hajjar et al. | | | |
| 2009/0174632 | A1 | 7/2009 | Hajjar et al. | | | |
| 2010/0020377 | A1 | 1/2010 | Borchers et al. | | | |
| 2010/0097678 | A1 | 4/2010 | Hajjar | | | |

FOREIGN PATENT DOCUMENTS

| | | |
|---|---|---|
| EP | 0196862 | 10/1986 |
| EP | 0271650 | 6/1988 |
| EP | 0618472 | 10/1994 |
| EP | 1150361 | 10/2001 |
| JP | 56164826 | 12/1981 |
| JP | 58-093147 | 6/1983 |
| JP | 59-155826 | 9/1984 |
| JP | 02-157790 | 6/1990 |

OTHER PUBLICATIONS

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

Supplementary European Search Report dated Mar. 25, 2009 for European Patent Application No. 06740108.3 (7 pages).

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.

International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.

International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.

Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

Kim, J M et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1-in. CRTs", 1997 SID International Symposium Digest of Technical Papers ( SID '97 Digest), vol. XVIII, pp. 440-443 (May 1997).

Extended European Search Report for Application No. EP 07783797, dated Dec. 10, 2009, 5 pages.

USPTO Final Office action in U.S. Appl. No. 11/335,813, mailed Mar. 15, 2010 (17 pages).

USPTO Non-Final Action in U.S. Appl. No. 11/116,998, mailed Aug. 5, 2008, 25 pages.

USPTO Non-Final Action U.S. Appl. No. 11/337,170, mailed Jun. 12, 2009, 50 pages.

Supplementary European Search Report dated Jul. 29, 2009 for European Patent Application No. 06836510.5 (6 pages).

The Korean Intellectual Property Office, Office Action dated Mar. 31, 2009 for Korean Patent Application No. 10-2007-7025455 (4 pages).

English language translation of The Korean Intellectual Property Office, Office Action dated Mar. 31, 2009 for Korean Patent Application No. 10-2007-7025455 (5 pages).

International Search Report and Written Opinion dated Jan. 28, 2010 for PCT/US2009/051878, now WO 2010/012003, 11 pages.

Supplementary European Search Report and Search Opinion for Application No. EP 07750816, dated Mar. 1, 2011, 10 pages.

Official Action for Application No. 2009146834, dated Apr. 12, 2011, 7 pages.

\* cited by examiner

MULTILAYERED FLUORESCENT SCREENS FOR SCANNING BEAM DISPLAY SYSTEMS

CROSS-REFERENCE TO RELATED APPLICATIONS

This application is a divisional application of and claims priority to U.S. application Ser. No. 11/514,720, filed on Aug. 31, 2006, which claims the benefits of U.S. Provisional Application No. 60/800,870 entitled "Display Systems Using Fluorescent Screens Including Fluorescent Screens With Prismatic Layer" and filed May 15, 2006, and PCT Patent Application No. PCT/US2006/11757 entitled "Display Systems Having Screens With Optical Fluorescent Materials" and filed Mar. 31, 2006, the entire disclosures of which are incorporated by reference as part of the specification of this application.

BACKGROUND

This application relates to display systems that use screens with fluorescent materials to emit colored light under optical excitation, such as laser-based image and video displays and screen designs for such displays.

Many image and video displays are designed to directly produce color images in different colors, such as red, green and blue and then project the color images on a screen. Such systems are often referred to as "projection displays" where the screen is simply a surface to make the color images visible to a viewer. Such projection displays may use white light sources where white beams are filtered and modulated to produce images in red, green and blue colors. Alternatively, three light sources in red, green and blue may be used to directly produce three beams in red, green and blue colors and the three beams are modulated to produce images in red, green and blue. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the color images on a screen. Another example of laser-based projection displays is described in U.S. Pat. No. 5,920,361 entitled "Methods and apparatus for image projection." Projection displays use optical lens systems to image and project the color images on the screen.

Some other image and video displays use a "direct" configuration where the screen itself includes light-producing color pixels to directly form color images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which produce light in red, green and blue, respectively, by either directly emit colored light as in LED displays and FEDs or by filtering white light such as the LCDs.

These and other displays are replacing cathode-ray tube (CRT) displays which dominated the display markets for decades since its inception. CRT displays use scanning electron beams in a vacuum tube to excite color phosphors in red, green and blue colors on the screen to emit colored light to produce color images. Although CRT displays can produce vivid colors and bright images with high resolutions, the use of cathode-ray tubes places severe technical limitations on the CRT displays and leads to dramatic decline in demand for CRT displays in recent years.

SUMMARY

The specification of this application describes, among others, fluorescent screens, and display systems and devices based on such screens using at least one excitation optical beam to excite one or more fluorescent materials on a screen which emit light to form images. The fluorescent materials may include phosphor materials and non-phosphor materials such as quantum dots.

In one example, a display screen includes parallel screen layers which are engaged to form a planar stack and include a fluorescent layer absorbing excitation light at an excitation wavelength to emit visible light at a different visible wavelength, and a prismatic layer including a plurality of prism elements which receive and couple the excitation light to the fluorescent layer.

In another example, a display screen includes screen layers which are engaged to form a planar stack and include a fluorescent layer including parallel fluorescent stripes and absorbing excitation light at an excitation wavelength to emit visible light at a different and visible wavelength. The screen layers also include parallel stripe dividers each located between two adjacent fluorescent stripes. Each strip divider includes side walls that are reflective and opaque to the emitted visible light to optically isolate two adjacent fluorescent stripes. A dielectric layer is included to be in contact with the stripe dividers and spaced from the fluorescent layer to define a gap between the dielectric layer and each fluorescent stripe.

In another example, a display screen includes a screen substrate, and a fluorescent layer formed over the screen substrate to include parallel fluorescent stripes which absorb excitation light to emit visible light. The excitation light and the visible light are at different wavelengths. The display screen also include parallel stripe dividers each located between two adjacent fluorescent stripes, and a dichroic layer formed over the screen substrate to receive the excitation light. The dichroic layer transmits the excitation light and reflects the visible light.

In another example, a display screen includes a fluorescent layer which includes parallel fluorescent stripes that absorb excitation light to emit visible light. The excitation light and the visible light are at different wavelengths. An entrance layer is formed on a first side of the fluorescent layer to receive the excitation light and to direct the excitation light to the fluorescent layer. A filter layer is also formed a second side of the fluorescent layer opposing the first side. This filter layer is formed of a material that transmits the visible light with an attenuation uniform over a spectral range of the visible light.

In yet another example, a display screen includes a fluorescent layer that absorbs excitation light to emit visible light; and a first layer on a first side of the fluorescent layer operable to transmit the excitation light and to reflect the visible light. The first layer includes a prismatic layer which comprises prism elements.

In yet another example, a display screen includes a fluorescent layer that absorbs excitation light to emit white light, and an array of color filters adjacent to the fluorescent layer to receive the emitted white light and to filter the white light to transmit colored light. Each color filter transmits a designated color and absorbs light of other colors. Each designated color for one color filter is different from a designated color transmitted by a neighboring color filter.

In yet another example, a display screen includes a first dielectric layer that transmits excitation light at an excitation wavelength; a fluorescent layer having parallel fluorescent stripes and absorbing the excitation light to emit visible light at a different and visible wavelength; and a second dielectric layer spaced from the fluorescent stripes by an air gap. The second dielectric layer at least partially transmits the visible light. The fluorescent layer is positioned between the first and second dielectric layers.

These and other examples and implementations are described in detail in the drawings, the detailed description, and the claims.

DETAILED DESCRIPTION

Figure 1:
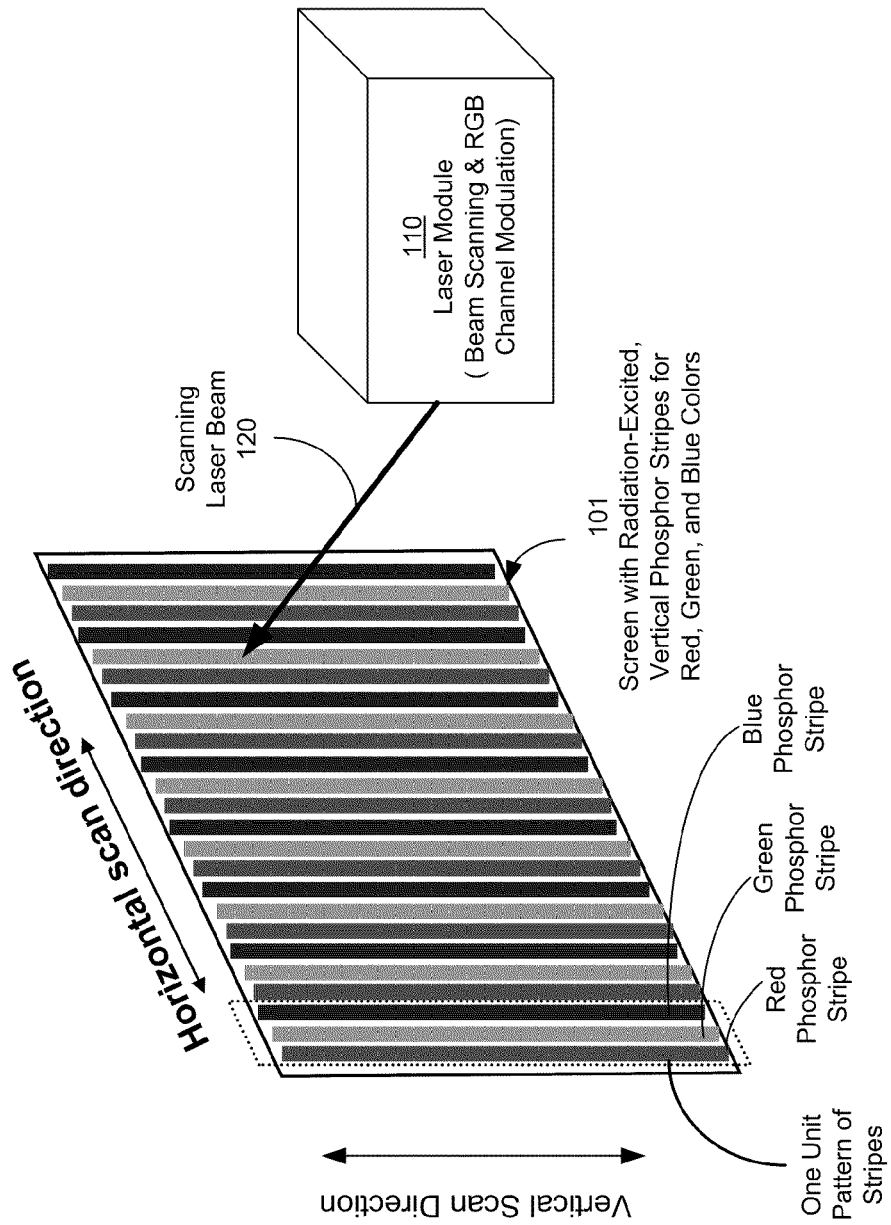
FIG. 1 shows an example scanning laser display system having a fluorescent screen made of laser-excitable fluorescent materials (e.g., phosphors) emitting colored lights under excitation of a scanning laser beam that carries the image information to be displayed.

This application describes scanning beam display systems that use screens with fluorescent materials to emit light under optical excitation to produce images, including laser video display systems. Various examples of screen designs with fluorescent materials are described. Screens with phosphor materials under excitation of one or more scanning excitation laser beams are described in detail and are used as specific implementation examples of optically excited fluorescent materials in various system and device examples in this application.

In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays.

Phosphor materials are one type of fluorescent materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Figure 2A:
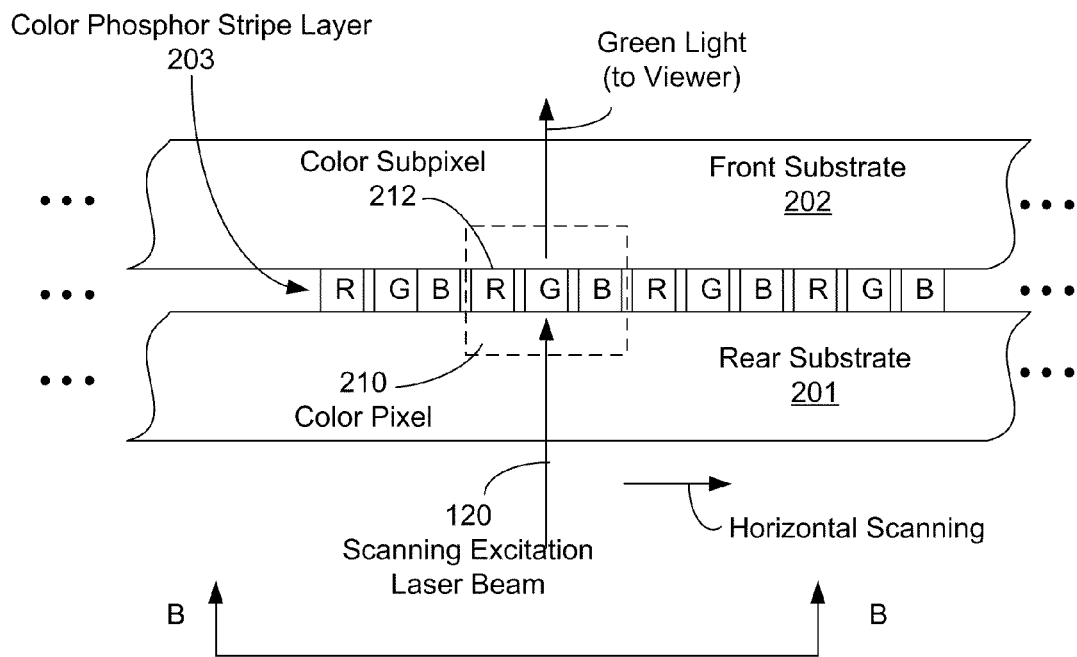
FIGS. 2A and 2B show one example screen structure and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
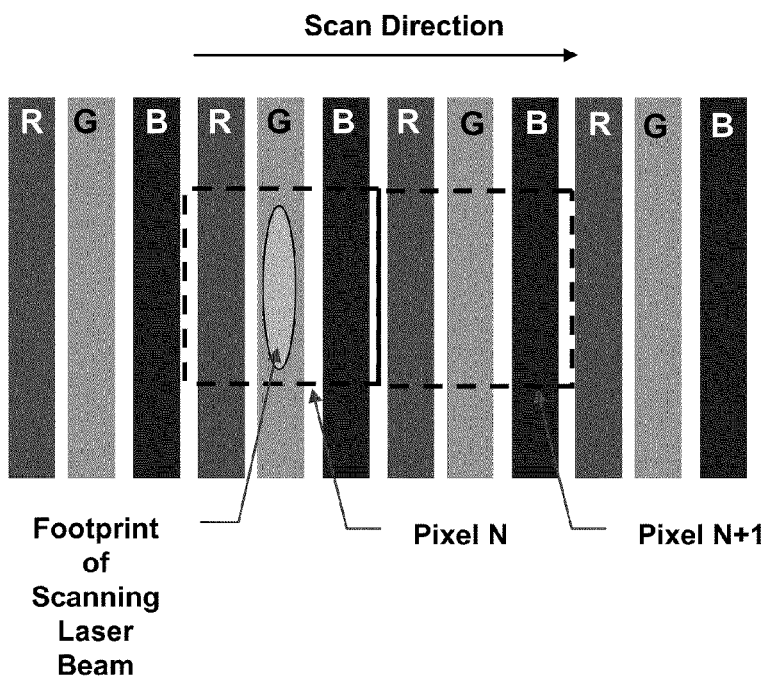

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Each of the fluorescent stripes in the fluorescent screen 101 in various examples described in this application is a fluorescent stripe that emits a designated color under optical excitation and can be a fluorescent stripe formed of a particular fluorescent material that emits the designed color as shown in the example in FIG. 2A. Alternatively, a fluorescent stripe can be constructed by a combination of a stripe color filter over a contiguous and uniform white fluorescent layer that is made of mixed phosphors that emit white light under optical excitation of the excitation light 120. Hence, a filter layer of color filters, such as stripes of red-transmitting, green-transmitting and blue-transmitting filters, is placed on the viewer side of the mixed phosphor layer to filter the white light and to produce colored output light. The details of the construction of the fluorescent stripes are described in a later section of this specification with reference to FIG. 10. In this context, a fluorescent layer has a composite structure with a filter layer and a contiguous fluorescent layer that emits white light.

Figure 3:
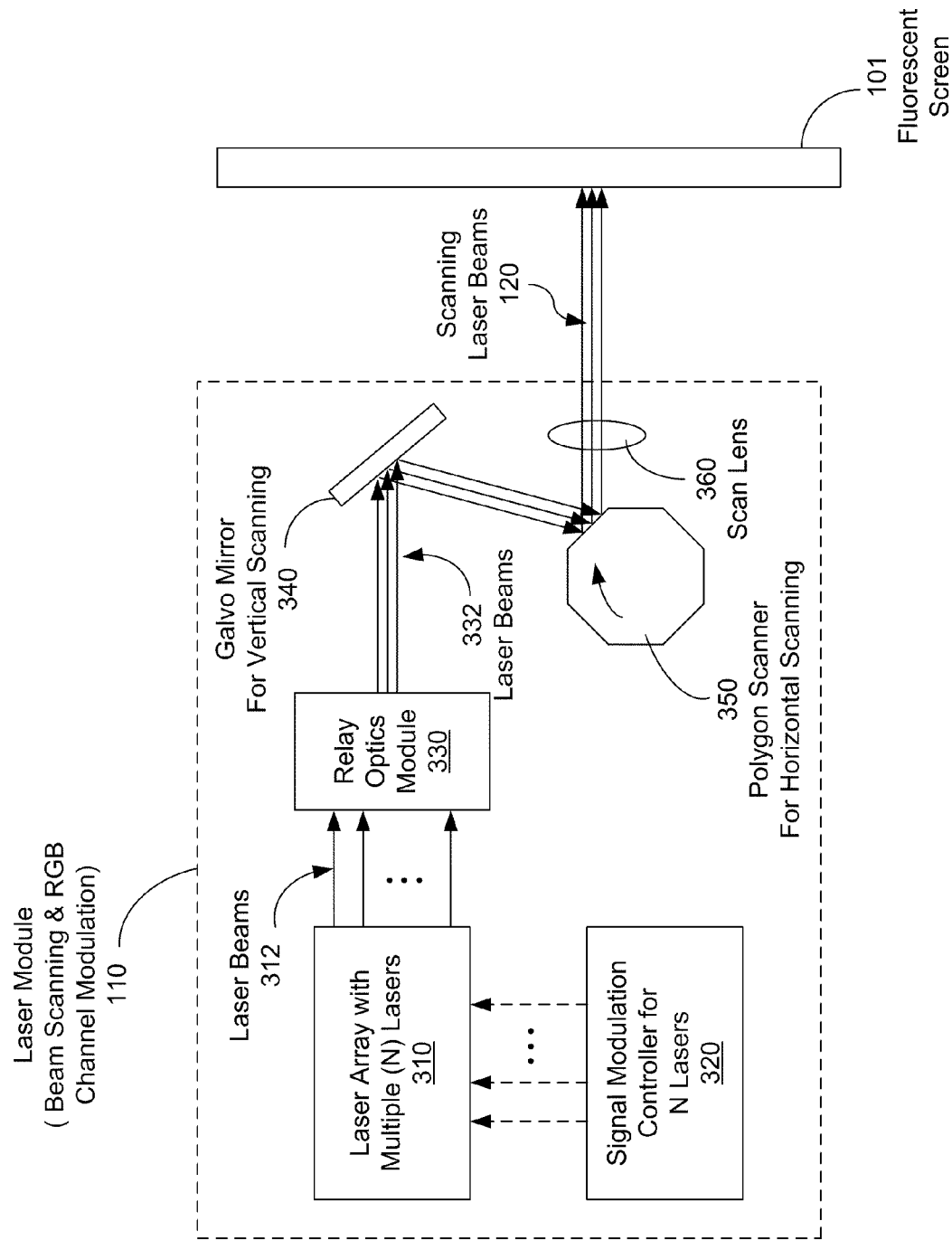
FIG. 3 shows an example implementation of the laser module in FIG. 1 having multiple lasers that direct multiple laser beams on the screen.

Referring now to FIG. 3, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

The stripe design in FIG. 2B for the fluorescent screen 101 in FIGS. 1 and 3 can be implemented in various configurations. FIG. 2A shows one example which places the fluorescent layer 203 such as a color phosphor stripe layer between two substrates 201 and 202. In a rear projection system, it is desirable that the screen 101 couple as much light as possible in the incident scanning excitation beam 120 into the fluorescent layer with while maximizing the amount of the emitted light from the fluorescent layer that is directed towards the viewer side. A number of screen mechanisms can be implemented, either individually or in combination, in the screen 101 to enhance the screen performance, including efficient collection of the excitation light, maximization of fluorescent light directed towards the viewer side, enhancement of the screen contrast and reduction the screen glare. The structure and materials of the screen 101 can be designed and selected to meet constraints on cost and other requirements for specific applications.

Figure 4:
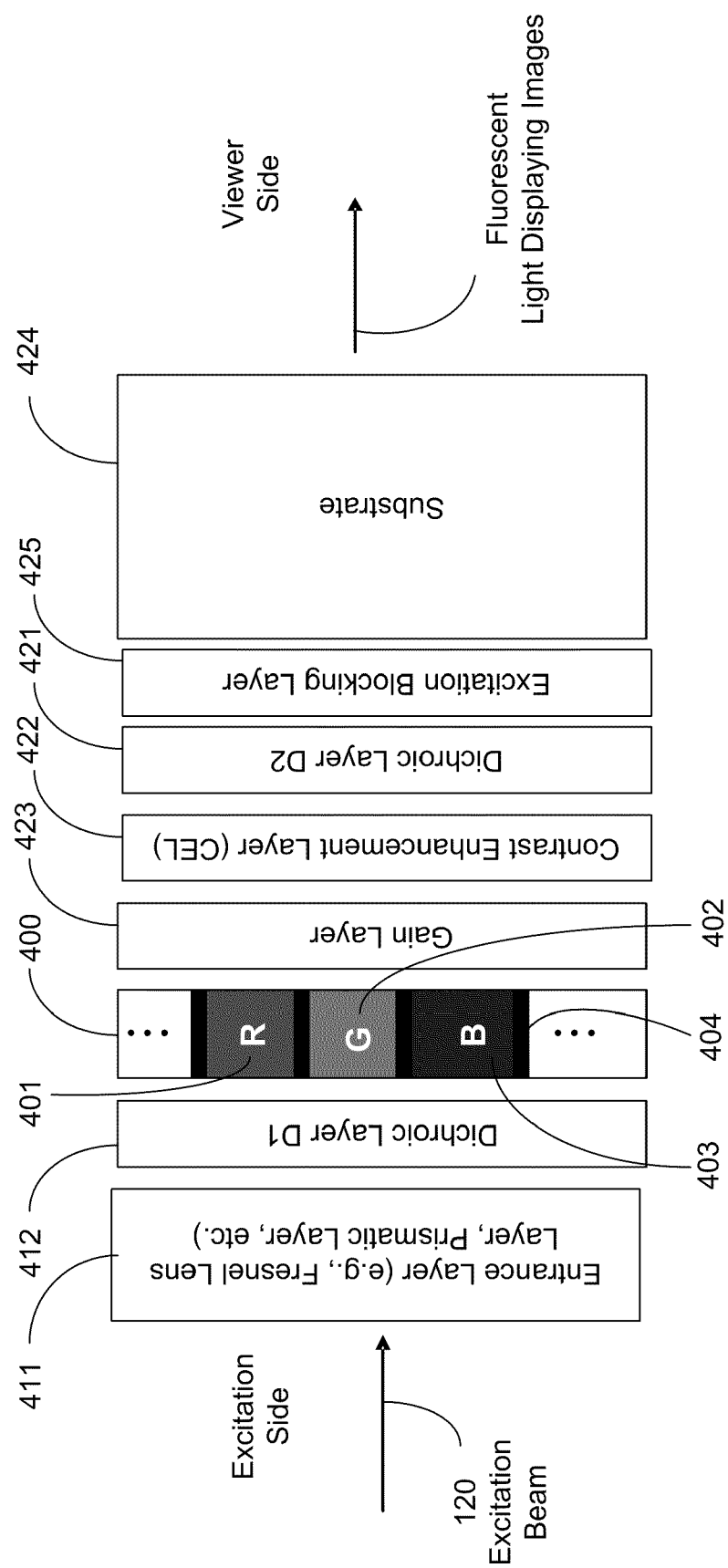
FIG. 4 illustrates an example screen having a fluorescent stripe layer with fluorescent stripes for emitting red, green and blue colors under optical excitation of the scanning excitation light.

FIG. 4 illustrates an example screen 101 having a fluorescent stripe layer with fluorescent stripes for emitting red, green and blue colors under optical excitation of the scanning excitation light. A number of screen features are illustrated as examples and can be selectively implemented in specific screens. Hence, a particular fluorescent screen having only some of the features illustrated in FIG. 4 may be sufficient for a particular display application.

The fluorescent screen 101 in FIG. 4 includes at least one substrate layer 424 to provide a rigid structural support for various screen components including a fluorescent layer 400. This substrate layer 424 can be a thin substrate or a rigid sheet. When placed on the viewer side of the fluorescent layer 400 as illustrated in FIG. 4, the substrate layer 424 can be made of a material transparent or partially transparent to the visible colored light emitted by the fluorescent stripes 401, 402, 403. A partial transparent material can have a uniform attenuation to the visible light including the three colors emitted by the fluorescent stripes to operate like an optical neutral density filter. The substrate layer 424 can be made of a plastic material, a glass material, or other suitable dielectric material. For example, the substrate layer 424 may be made of an acrylic rigid sheet. The thickness of the substrate layer 424 may be a few millimeters in some designs. In addition, the substrate layer 424 may be made reflective and opaque to the excitation light of the excitation beam 120 to block the excitation light from reaching the viewer and to recycle the unabsorbed excitation light back to the fluorescent layer 400.

The substrate layer 424 can also be located on the other side of the fluorescent layer 400. Because the excitation beam 120 must transmit through the substrate layer 424 to enter the fluorescent layer 400, the material for the substrate layer 424 should be transparent to the excitation light of the excitation beam 120. In addition, the substrate layer 424 in this configuration may also be reflective to the visible light emitted by the fluorescent layer 400 to direct any emitted visible light coming from the fluorescent layer 400 towards the viewer side to improve the brightness of the displayed images.

The fluorescent layer 400 includes parallel fluorescent stripes with repetitive color patterns such as red, green and blue phosphor stripes. The fluorescent stripes are perpendicular to the horizontal scan direction of the scanning excitation beam 120 shown in FIG. 1. As illustrated in FIG. 4 and in FIG. 2B, each display pixel on the screen includes three subpixels which are portions of adjacent red, green and blue stripes 401, 402 and 402. The dimension of each subpixel along the horizontal direction is defined by the width of each stripe and the dimension along the vertical direction is defined by the beam width along the vertical direction. A stripe divider 404, which can be optically reflective and opaque, or optically absorbent, may be formed between any two adjacent fluorescent stripes to minimize or reduce the cross talk between two adjacent subpixels. As a result, the smearing at a boundary between two adjacent subpixels within one color pixel and between two adjacent color pixels can be reduced, and the resolution and contrast of the screen can be improved. The sidewalls of each stripe divider 404 can be made optically reflective to improve the brightness of each subpixel and the efficiency of the screen.

The above basic structure of the substrate layer 424 and the fluorescent layer 400 can be used as a building block to add one or more screen elements to enhance various properties and the performance of the screen. The fluorescent layer 400 is an optically active layer in the context that the excitation light at the excitation wavelength is absorbed by the fluorescent materials and is converted into visible fluorescent light of different colors for displaying the images to the viewer. In this regard, the fluorescent layer 400 is also the division between the "excitation side" and the "viewer side" of the screen where the optical properties of the two sides are designed very differently in order to achieve desired optical effects in each of two sides to enhance the screen performance. Examples of such optical effects include, enhancing coupling of the excitation beam 120 into the fluorescent layer, recycling reflected and scattered excitation light that is not absorbed by the fluorescent layer 400 back into the fluorescent layer 400, maximizing the amount of the emitted visible light from the fluorescent layer 400 towards the viewer side of the screen, reducing screen glare to the viewer caused by reflection of the ambient light, blocking the excitation light from existing the screen towards the viewer, and enhancing the contrast of the screen. Various screen elements can be configured to achieve one or more of these optical effects. Several examples of such screen elements are illustrated in FIG. 4.

Referring to FIG. 4, at the entry side of the screen facing the excitation beam 120, an entrance layer 411 can be provided to couple the excitation beam 120 into the screen 101. A Fresnel lens layer can be used as this entrance layer 411 to control the incidence direction of the scanning excitation beam 120. A prismatic layer or a high-index dielectric layer can also be used as part of the entrance layer 411 to recycle light back into the screen including the excitation light and the emitted visible light by the fluorescent layer. To improve the brightness of the screen to the viewer, a first dichroic layer 412 (D1) can be placed in the path of the excitation beam 120 upstream from the fluorescent layer 400 to transmit light at the wavelength of the excitation beam 120 and to reflect visible light emitted by the fluorescent layer 400. The first dichroic layer 412 can reduce the optical loss of the fluorescent light and thus enhances the screen brightness. On the viewer side of the fluorescent layer 400, a second dichroic layer 421 (D2) can be provided to transmit the visible light emitted by the fluorescent layer 400 and to reflect light at the wavelength of the excitation beam 120. Hence, the second dichroic layer 421 can recycle the excitation light that passes through the fluorescent layer 400 back to the fluorescent layer 400 and thus increases the utilization efficiency of the excitation light and the screen brightness.

On the viewer side of the fluorescent layer 400, a contrast enhancement layer 422 can be included to improve the screen contrast. The contrast enhancement layer 422 can include color-selective absorbing stripes that spatially correspond to and align with fluorescent stripes in the fluorescent layer 400 along the direction perpendicular to the screen layers. The color-selective absorbing stripes therefore transmit light in respective colors of the fluorescent stripes and absorb light in colors of other fluorescent stripes, respectively. Alternatively, the contrast enhancement layer 422 can be an optical neutral density filter layer that uniformly attenuates the visible light to reduce the glare of the screen due to the reflection of the ambient light. This neutral density filtering function may also be implemented in one or more other layers on the viewer side of the fluorescent layer 400, including the substrate layer 424.

In addition, the screen can include a screen gain layer 423 on the viewer side of the fluorescent layer 400 to optically enhance the brightness and viewing angle of the screen. The gain layer 423 may include a lenticular layer with lens elements, a diffractive optic layer of diffractive elements, a holographic layer with holographic elements, or a combination of these and other structures. The spatial sequence of the layers 423, 422 and 421 on the viewer side of the fluorescent layer 400 may be different from what is shown in FIG. 4.

Furthermore, an excitation blocking layer 425 can be placed on the viewer side of the fluorescent layer 400 to block any excitation light from exiting the screen to the viewer side. This layer can be implemented by a material that transmits the visible light and absorbs the excitation light. For example, a polyester based color filter can be used as this layer to block the excitation light which may be radiation from 400-415 nm. In some implementations, this blocking filter may have transmission below 410 nm less than 0.01%, while having greater than 50% transmission above 430 nm. The neutral density filtering function can also be incorporated in this layer, e.g., having a uniform attenuation to the visible light between 430 nm and 670 nm. This blocking function can be incorporated into the substrate layer 424.

Figure 5:
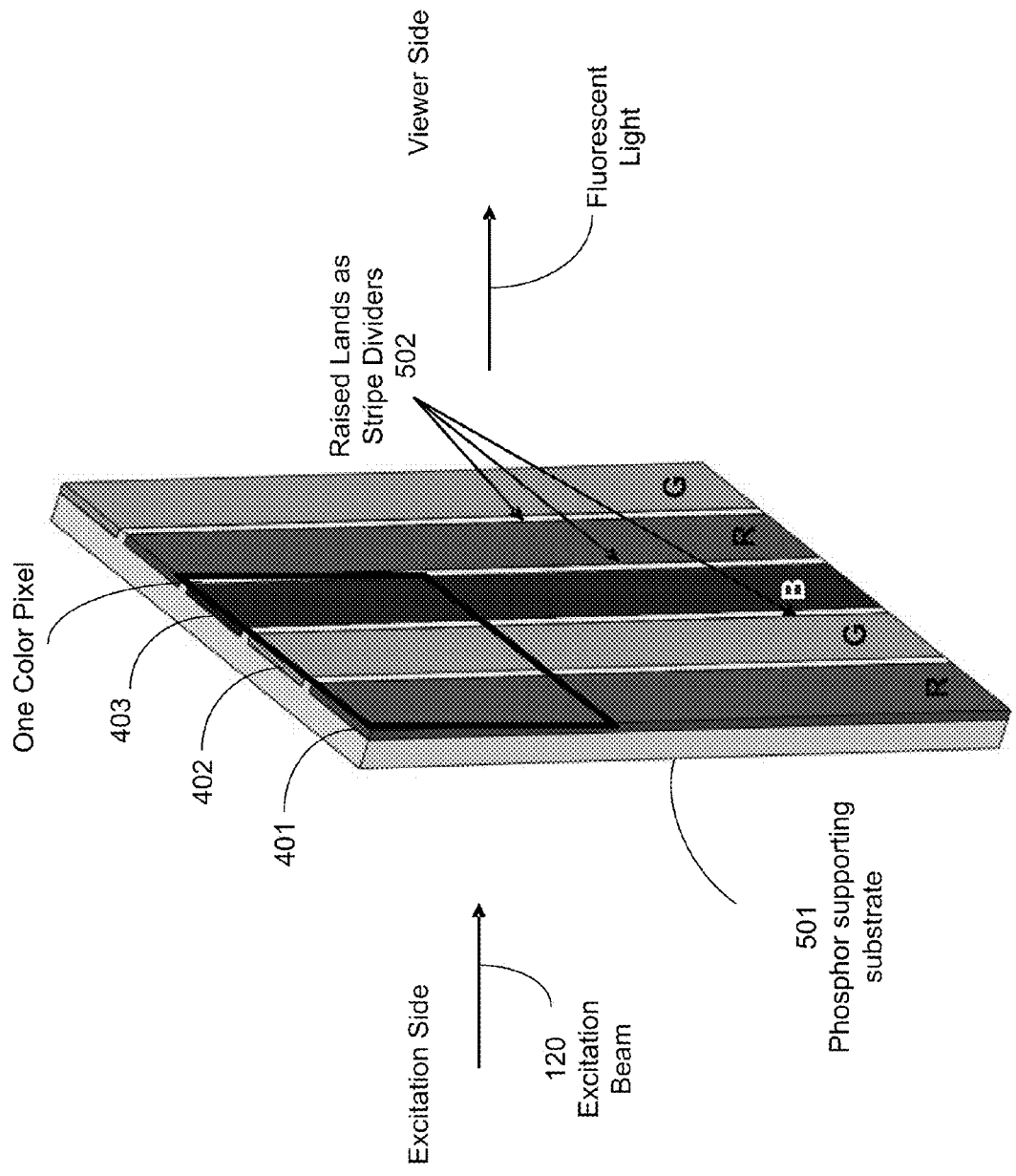
FIG. 5 shows an example fluorescent layer with fluorescent stripes formed on a supporting substrate.

FIG. 5 shows an example fluorescent layer 400 formed on a supporting substrate 501. The fluorescent layer 400 has fluorescent stripes where adjacent three stripes are 401, 402, 403 for emitting red, green and blue colors, respectively. The supporting substrate 501 includes parallel raised lands 502 as stripe dividers to divide the surface into parallel channels in which the fluorescent materials are placed to form the fluorescent stripes 401, 402, 403, etc. The sidewalls of the raised lands 502 physically separate the different fluorescent stripes and can be made optically reflective and opaque to block crosstalk or color mixing between two adjacent fluorescent stripes that emit two different colors, respectively. The reflective sidewalls of the raised lands 502 prevent loss of light emitted in each fluorescent stripe. In addition, the parallel channels formed between the raided lands 502 can be used to control the volume of the fluorescent material deposited during the formation of the fluorescent layer.

Figure 6:
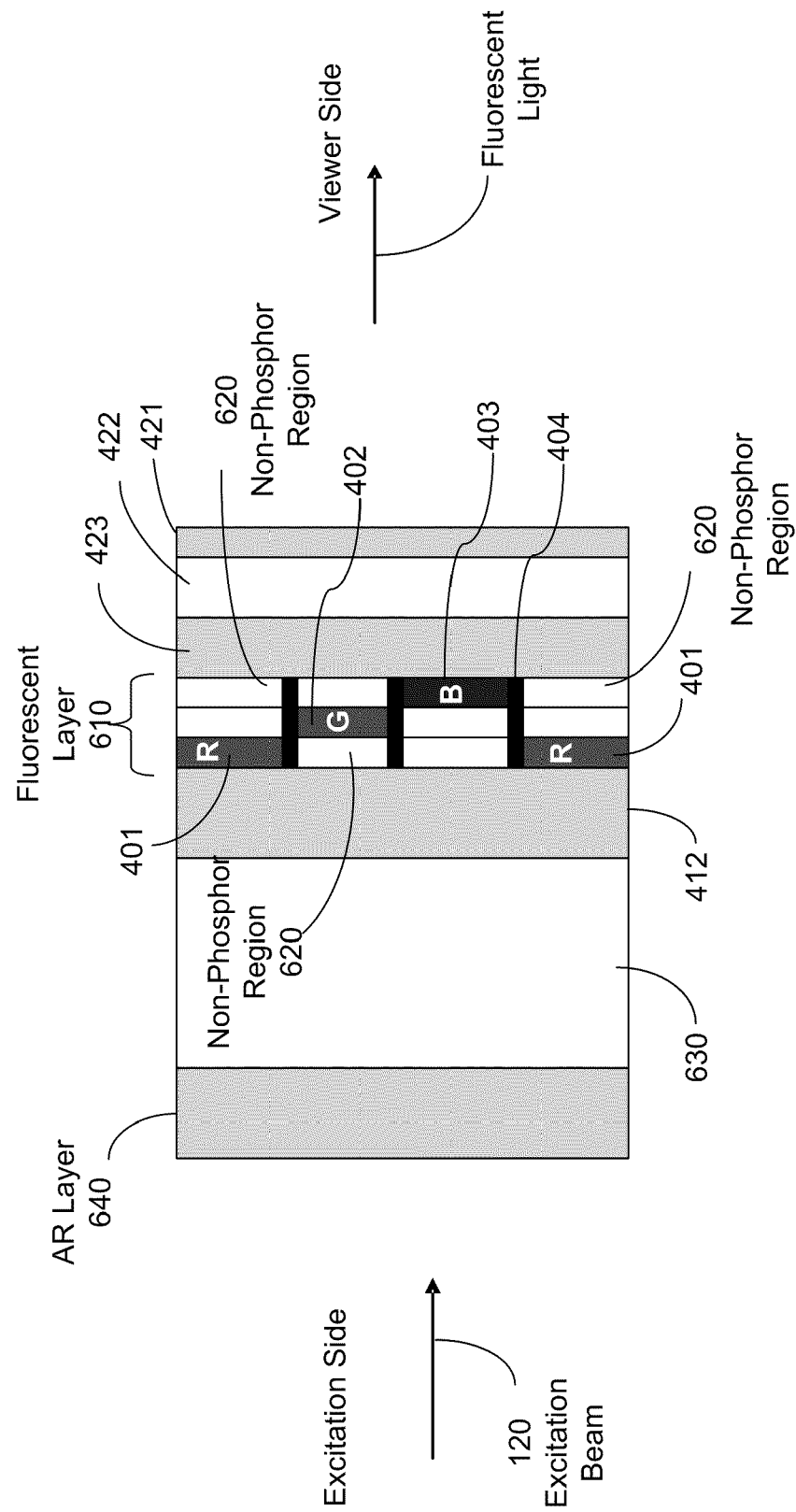
FIG. 6 shows an example of a fluorescent screen with two dichroic layers.

FIG. 6 shows an example of a fluorescent screen with two dichroic layers 412 and 421. A fluorescent layer 610 includes different fluorescent or phosphor layers for different colors are formed at different layers and do not overlap with one another. As illustrated, each layer includes patterned phosphor regions of the same phosphor for one color and non-phosphor regions 620 with a filler material that is transparent. The dividers 404 for reducing color crosstalk may be physically printed with color phosphors, or contained in separate layers. The multi-layer structure of the fluorescent layer 610 may be implemented in different configurations. For example, a host substrate can be used to support different phosphors where non-overlapping phosphor patterns are coated on either side of the substrate. This design of the phosphor layers allows different phosphor layers to be individually fabricated and laminated together by, e.g., using a suitable optical adhesive or an optical pressure-sensitive film. A substrate or rigid sheet 630 is located on the excitation side of the fluorescent layer 610 to support the various layers of the screen and can be made from, e.g., acrylic, rigid optical plastic material, a stretched membrane, and a glass material. An anti-reflection (AR) layer 640 can be formed on the surface of the substrate 630 through which the excitation beam 120 enters the screen.

Turning now specifically to the dichroic layers 412 and 421 in FIG. 4, the first dichroic layer D1 412 can prevent loss of light emitted from the fluorescent layer 400 towards the excitation side and reflect the emitted light towards the viewer side. The second dichroic layer 421 (D2) is to transmit the visible light and to reflect light at the wavelength of the excitation laser light 120. This screen design with the two dichroic layers 412 and 421 can effectively confine the excitation light such as UV light within the fluorescent layer 400 so that the unabsorbed excitation light, after passing through the fluorescent layer 400, is reflected back by the dichroic layer 421 (D2) to continue interacting with the fluorescent materials in the fluorescent layer 400 to improve the utility efficiency of the excitation light. In addition, the visible light emitted by the fluorescent layer 400, which originally tends to be in all directions, is directed by the dichroic layer 412 (D1) towards the viewer side of the screen to be viewed by a viewer without leaking to the excitation side of the screen. Accordingly, the overall utility efficiency of the emitted light and the brightness of the screen can be enhanced.

Figure 7A:
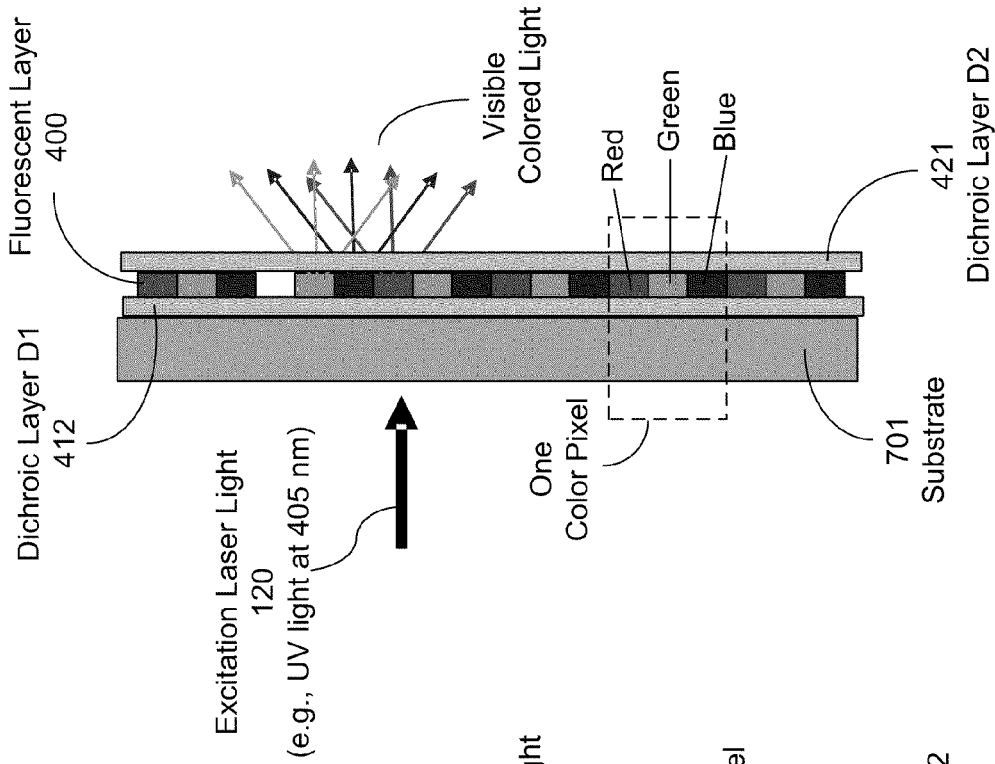
FIGS. 7A and 7B illustrate two screen examples based on the screen design in FIG. 6.
Figure 7B:
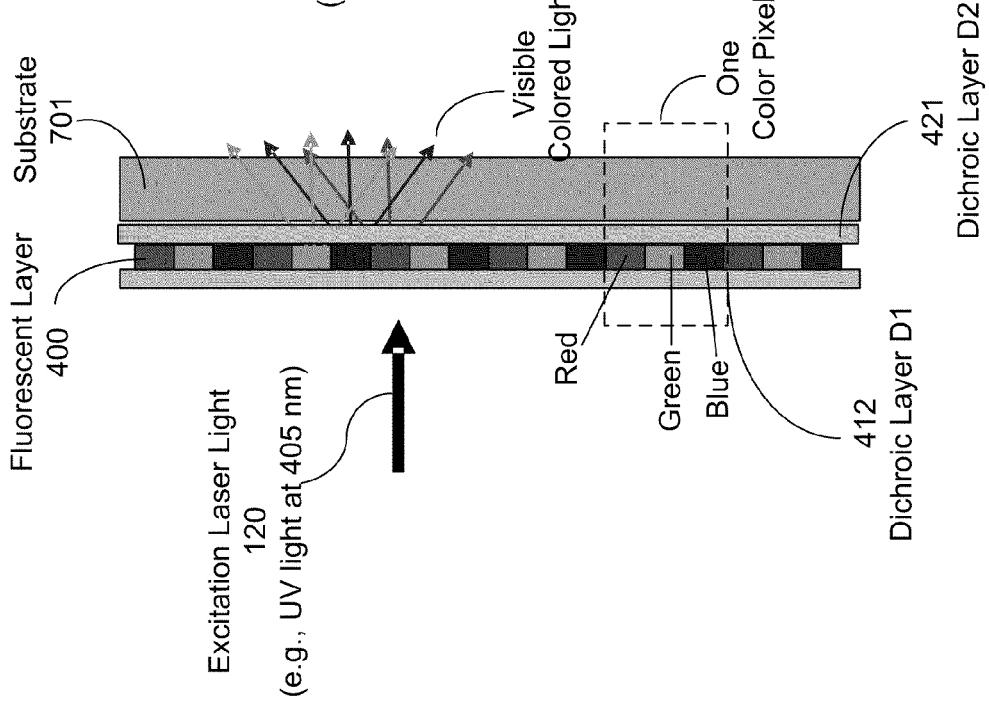

FIGS. 7A and 7B illustrate two screen examples based on the above screen design. A substrate 701 is provided to support the dichroic layers 412, 421 and the fluorescent layer 400. FIG. 7A shows an example where the substrate 701 is on the side of the dichroic layer 421 so that the emitted light exits the screen through the substrate 701. FIG. 7B shows an example where the substrate 701 is on the side of the dichroic layer 412 and the incident excitation beam 120 enters the screen through the substrate 701. In one example, the excitation beam 120 can be UV laser light around 405 nm. The D1 layer 412 reflects visible light with a wavelength greater than 430 nm and transmits UV light with a wavelength shorter than 415 nm or 400 nm. In this example, the D2 layer 421 reflects UV light with a wavelength shorter than 415 nm or even less than 400 nm and transmits visible light with a wavelength greater than 430 nm. Anti-reflection (AR) coatings may be used to further enhance the efficiency of the screen.

The configuration in FIG. 7A provides better transmission properties for the excitation light such as UV light, a minimum back reflection towards the excitation side, and allows the substrate 701 to act as a shield from the user interface side. The configuration in FIG. 7B allows the substrate 701 to be treated to form an optical diffractive element and other optical features in the entrance layer 411 to improve the coupling and recycling of the excitation light. A hard protective surface, e.g., a lacquer layer or capsulation layer may be formed on the viewer or user side of the screen to protect the screen from handling and environmental conditions.

TABLE 1

| CONSTRUCTION TYPE | 1st Layer | 2nd layer | 3rd layer | 4th Layer | 5th Layer | 6th Layer |
|---|---|---|---|---|---|---|
| Surface Incident | D1 | Phosphor | D2 | S | AR | |
| Surface Incident | L | D1 | Phosphor | D2 | S | AR |
| Substrate Incident | AR | Substrate | D1 | Phosphor | D2 | L |
| Substrate Incident | AR | Substrate | D1 | Phosphor | D2 | AR |

TABLE 1 shows four examples of 6-layer screens where the layers are labeled 1 through 6 in the spatial order from the excitation side to the viewer side of the screen. One or more phosphors are used to form the fluorescent layer and a capsulation layer such as a lacquer layer (L) is used to protect the overall screen structure from handling and environmental conditions. The substrate may be made of a plastic or glass material and, when located on the viewer side of the fluorescent layer, is capable of transmitting light in the spectral range of the visible light, e.g., 400-800 nm. Anti-reflective (AR) coating layers are also included in these examples.

Each of the above dichroic layers D1 (412) and D2 (421) may be implemented in various configurations. For large format displays, such a dichroic layer may be made of relatively inexpensive materials and be relatively easy to manufacture. Multiple dielectric layers can be designed to construct various wavelength-selective optical filters by controlling the refractive indices and the physical thickness values of the layers. For example, multiple layers of alternating high and low index dielectric layers may be designed to achieve desired wavelength-selective reflection and transmission spectra. Multiple sheets of films with different refractive indices may be laminated or fused together to construct a composite sheet as the D1 or D2 dichroic layer. In some implementations, multiple layers of two different materials with different indices may be used to form a composite film stack as D1 or D2 by placing the two materials in an alternating manner. In other implementations, three or more different materials with different indices may be stacked together to form the composite film stack as D1 or D2. Such a composite sheet for the D1 layer is essentially an optical interference reflector that transmits the excitation light (e.g., UV light) and reflects the colored visible light. The materials for the composite sheets may be organic materials, inorganic materials or a combination of organic and inorganic materials that can be rigid or flexible.

A flexible multi-layer composite sheet may be formed from polymeric, non-polymeric materials, or polymeric and non-polymeric materials. Exemplary films including a polymeric and non-polymeric material are disclosed in U.S. Pat. No. 6,010,751 entitled "Method for forming a multicolor interference coating" and U.S. Pat. No. 6,172,810 entitled "Retroreflective articles having polymer multilayer reflective coatings," which are incorporated by reference in their entirety as part of the specification of this application. An all-polymer construction for a composite sheet can offer manufacturing and cost benefits. High temperature polymers with high optical transmission and large index differentials can be used to construct the interference filter that is environmentally stable, thin and flexible. Coextruded multilayer interference filters as disclosed in U.S. Pat. No. 6,531,230 entitled "Color shifting film" can be used to provide precise wavelength selection and can be made as a filter film in a large area at a relatively low cost. The entire disclosure of U.S. Pat. No. 6,531,230 is incorporated by reference as part of the specification of this application. The use of polymer pairs having high index differentials allows the construction of thin, highly reflective mirrors that are freestanding without a substrate and can be easily processed for constructing large screens. Such a composite sheet is functionally a piece of a multi-layer optical film (MOF) which can be, e.g., a stack of alternating layers of PET and co-PMMA to exhibit a normal-incidence reflection band suitable for screen applications. As an example, an enhanced specular reflector (ESR) made out of a multilayer polyester-based film from 3M Corporation may be configured to produce the desired dichroic reflection and transmission bands for the present application. Examples for various features of multi-layer films are described in U.S. Pat. No. 5,976,424 entitled "Method for making multilayer optical films having thin optical layers," U.S. Pat. No. 5,080,467 entitled "Biphenyl derivatives for photostabilization in pulsed optical darkening apparatus and method" and U.S. Pat. No. 6,905,220 entitled "Backlight system with multilayer optical film reflector," all of which are incorporated by reference as part of the specification of this application.

The stripe dividers shown in FIGS. 4, 5 and 6 provide physical separation and optical isolation between different subpixels and can enhance the image contrast by reducing crosstalk between different subpixels and different pixels. Such crosstalks are caused by the internal structure of the screen. Various external factors can also adversely affect the image contrast and other performance parameters of the screens. For example, a portion of the ambient light can be reflected off the screen and enter a viewer's eyes along with the displayed image formed by the emitted fluorescent light. This reflection of the ambient light towards the viewer generates a glare on the screen to the viewer and can reduce the contrast of the image perceived by the viewer. A contrast enhancement layer, such as the layer 422 in FIG. 4, can be used to reduce the glare.

Figure 8:
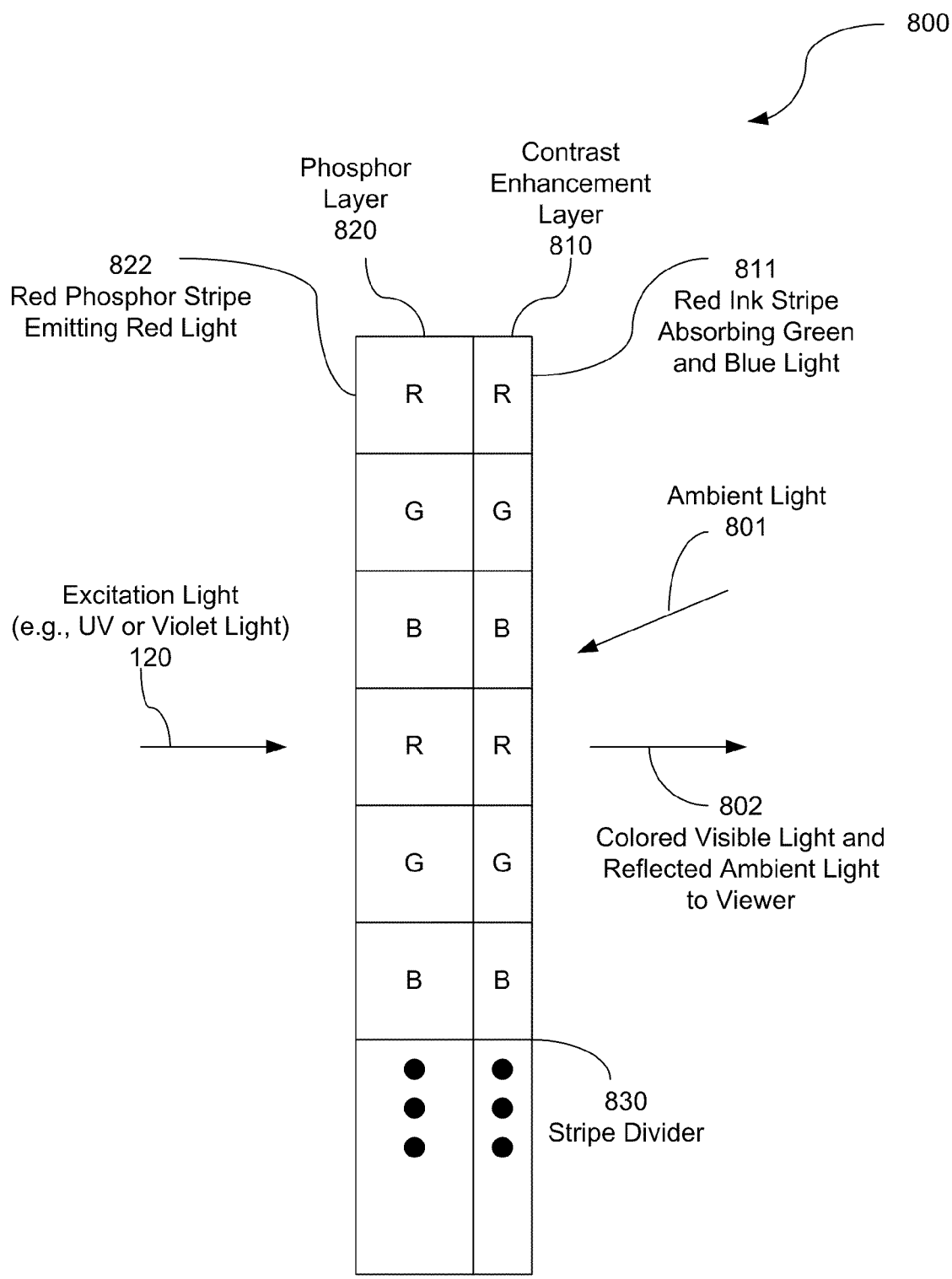
FIG. 8 shows a fluorescent screen design with a contrast enhancement layer.

FIG. 8 shows one example of a screen 800 that uses a contrast enhancement layer 810 on the viewer side of the fluorescent layer 820. The fluorescent layer 820 such as a phosphor layer includes parallel phosphor stripes. Accordingly, the contrast enhancement layer 810 also includes matching parallel stripes made of different materials. For a red phosphor stripe 821 that emits red light in response to excitation by the excitation light (e.g., UV or violet light), the matching stripe 811 in the contrast enhancement layer 810 is made of a "red" material that transmits in a red spectral band covering the red light emitted by the red phosphor stripe 821 and absorbs or otherwise blocks other visible light including the green and blue light. Similarly, for a green phosphor stripe that emits green light in response to excitation by UV light, the matching stripe in the contrast enhancement layer 810 is made of a "green" material that transmits in a green spectral band covering the green light emitted by the green phosphor and absorbs or otherwise blocks other visible light including the red and blue light. For a blue phosphor stripe that emits blue light in response to excitation by UV light, the matching stripe in the contrast enhancement layer 810 is made of a "blue" material that transmits in a blue spectral band covering the blue light emitted by the blue phosphor and absorbs or otherwise blocks other visible light including the green and red light. These matching parallel stripes in the contrast enhancement layer 810 are labeled as "R," "G" and "B," respectively.

In this example, the contrast enhancement layer 810 includes different stripe filtering regions that spatially align with and match respective fluorescent regions along the direction perpendicular to the screen. Each filtering region transmits light of a color that is emitted by a corresponding matching fluorescent region and blocks light of other colors. Different filtering regions in the layer 810 may be made of materials that absorb light of other colors different from the colors emitted by the respective matching fluorescent regions. Examples of suitable materials include dye-based colorants and pigment-based colorants. In addition, each filtering region in the contrast enhancement layer 810 can be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films" describe examples of red, green and blue filters that may be used in the layer 810 in the screen 800 in FIG. 8.

In operation, the excitation light 120 (e.g., UV light) enters the phosphor layer 820 to excite different phosphors to emit visible light of different colors. The emitted visible light transmits through the contrast enhancement layer 810 to reach the viewer. The ambient light 801 incident to the screen 800 enters the contrast enhancement layer 810 and a portion of the incident ambient light 801 is reflected towards the viewer by passing through the contrast enhancement layer 810 for the second time. Therefore, the total optical output 802 towards the viewer includes image-carrying colored visible light emitted by the phosphor layer 820 and the reflected ambient light. This reflected ambient light does not carry image and thus tends to wash out the image produced at the phosphor layer 820. Because this reflected ambient light towards the viewer has passed the contrast enhancement layer 810 twice and thus has been filtered and attenuated twice, the intensity of the reflected ambient light is reduced by approximately two thirds of that of the received ambient light. As an example, the green and blue portions of the incident ambient light 801 comprise approximately two thirds of the flux of the ambient light 801 entering a red subpixel. The green and blue portions of the incident ambient light 801 are blocked by the contrast enhancement layer 810. Only the red portion of the ambient light within the transmission band of the red filter material in the contrast enhancement layer 810 transmits through the layer 810 and a part of the transmitted red ambient light is reflected back to the viewer. This part of the reflected ambient light is essentially the same color for the subpixel generated by the underlying color phosphor stripe and thus the color contrast is not adversely affected.

In FIG. 8, two adjacent filter stripes in the contrast enhancement layer 810 can be separated by a stripe divider 830 made of either an optical reflective and opaque material or an optical absorbent material. Reflective dividers 830, like other stripe dividers described in this application, can be used to maximize the light output of the screen. For example, reflective white materials such as barium sulfate or TiO2 pigments can be used to form the stripe dividers 830. Other lambertian white materials may also be used to form the stripe dividers 830. The side walls of the stripe dividers may be a metallized reflective layer. One way to achieve a highly efficient reflective layer that is thin for the stripe dividers 830 is to coat a sidewall with a metallized underlayer and to further place a white pigment filled layer over the metallized underlayer. Absorbing dividers 830 can be used to provide color isolation and pixel separation but the screen output efficiency may be less than that of the reflective dividers due to the loss o flight by absorption of the sidewalls. In some implementations, a stripe divider 830 can include both reflective and absorbent portions. For example, a stripe divider 830 can have white reflective and opaque side walls, a white reflective facet towards the excitation side of the screen to provide optical reflection for the servo feedback, and a blackened absorbent facet towards the viewer side of the screen to reduce reflection towards the viewer and to improve the contrast.

The above use of a color-selective absorbent material in the contrast enhancement layer 810 for each subpixel to enhance the display contrast can also be implemented by mixing such a material with the light-emitting fluorescent material in each subpixel without a separate contrast enhancement layer. In one implementation, each phosphor region in the non-overlapping multi-layer design in FIG. 6 can be formed of a mixture of a fluorescent material and a color-selective absorbent material that transmits light emitted by the fluorescent material and absorbs light of other colors. Hence, the contrast enhancing feature is built into each subpixel to reduce the reflected ambient light to the viewer.

Figure 9:
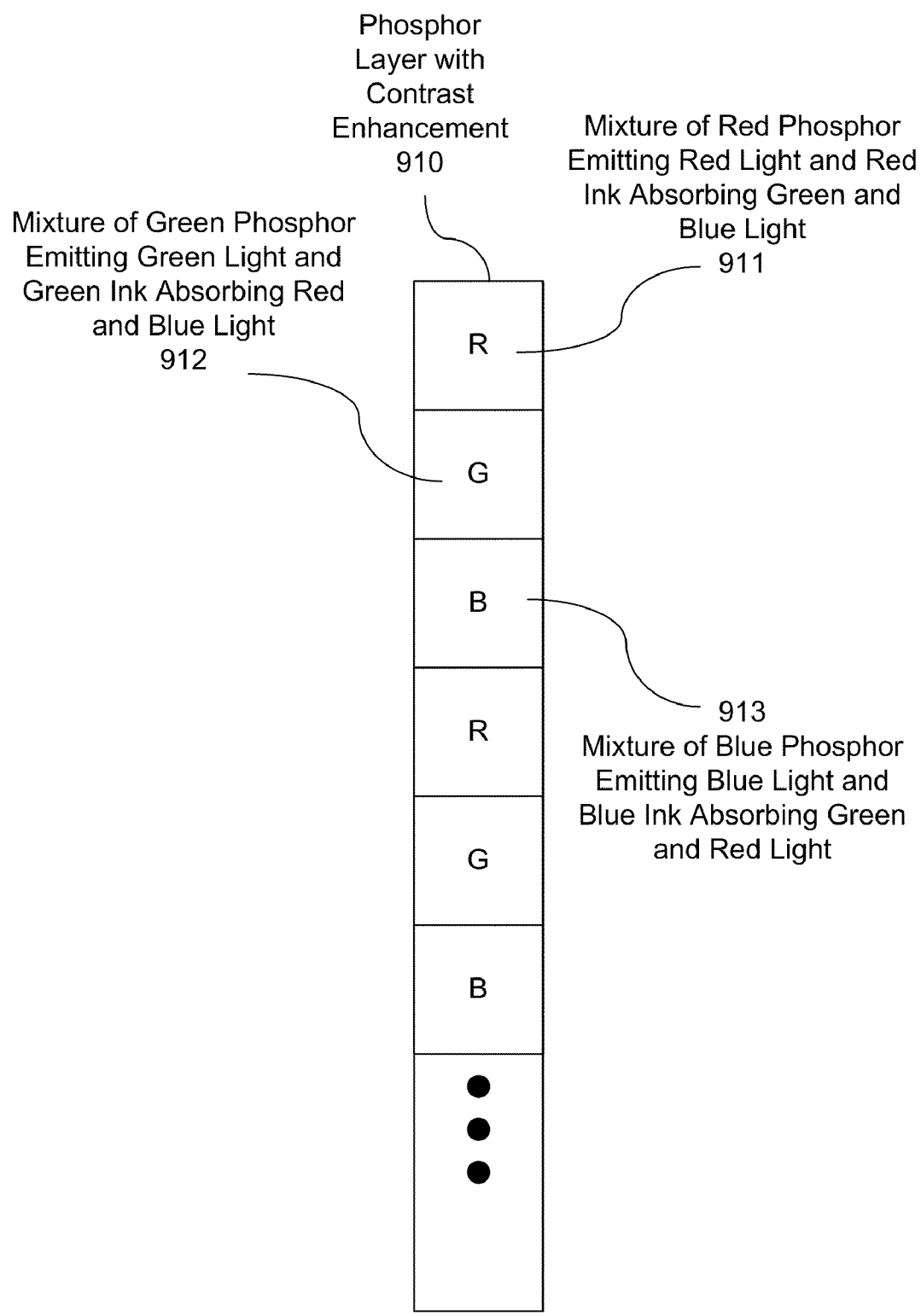
FIG. 9 shows a fluorescent screen design with a contrast enhancement material composition in each fluorescent stripe.

FIG. 9 shows another implementation that uses a phosphor layer 910 that uses red, green and blue phosphor materials with built-in contrast-enhancing capability for emitting red, green and blue light, respectively, in a common fluorescent layer 910 of parallel fluorescent stripes. Consider three consecutive red, green and blue phosphor stripes 911, 912 and 913. The material for the red phosphor stripe 911 is a mixture of a red phosphor emitting red light and a red ink or pigment which transmits the red light and absorbs other light including the green and blue light. Similarly, the material for the green phosphor stripe 912 is a mixture of a green phosphor emitting green light and a green ink or pigment which transmits the green light and absorbs other light including the red and blue light; and the material for the blue phosphor stripe 913 is a mixture of a blue phosphor emitting blue light and a blue ink or pigment which transmits the blue light and absorbs other light including the red and green light. This contrast-enhancing phosphor layer 910 can be combined with various screen designs and configurations described in this application.

In some implementations, the contrast enhancement layer 810 in FIG. 8 can be replaced by a filter layer that blocks transmission of the excitation light and uniformly attenuates visible light at the visible colors emitted by the fluorescent layer. Hence, to the excitation light, this filter layer is opaque and prevents any excitation light to appear on the viewer side of the screen; to the visible light, the filter layer behaves like a neutral density (ND) filter to attenuate the visible light including the reflected ambient light. Because ambient light that is reflected towards the viewer passes through this filter layer twice, the attenuation to the reflected ambient light is twice as much as the light generated by the fluorescent layer. Therefore, the contrast of the images displayed by emitted visible light in the fluorescent screen is enhanced in comparison with the same screen without the filter layer. Such an excitation light blocking ND filter layer can be less expensive than the contrast enhancement layer 810 formed of color filters. For example, this excitation light blocking ND filter layer may be a polyester layer that blocks radiation from 400 nm to 415 nm with a transmission less than 0.01% for light below 410 nm and a transmission of greater than 50% for light above 430 nm. The optical attenuation of the polyester layer can be approximately uniform for visible light between 430 nm and 670 nm. The actual amount of the attenuation of this filter layer can be selected based on specific requirements for a particular screen and may be above 50% in some designs and below 50% in other designs. The optical blocking function of this filter layer may be separately implemented from the neutral density filtering function. Hence, two separated layers, one excitation light blocking layer designed to block the excitation light and another neutral density filter layer to uniformly attenuates the visible light, can be implemented on the viewer side of the fluorescent layer in the screen.

The above described fluorescent screens use different phosphor materials in different fluorescent stripes to produce different colors under excitation of the excitation light. Alternatively, different fluorescent stripes can be formed by the same fluorescent material that emits white light and can further include color filters to produce desired different colors from the fluorescent light. The contrast enhancement layer 810 in FIG. 8 can be used to implement such color filters so that each color filter achieves both contrast enhancement and generation of a designated subpixel color.

Figure 10:
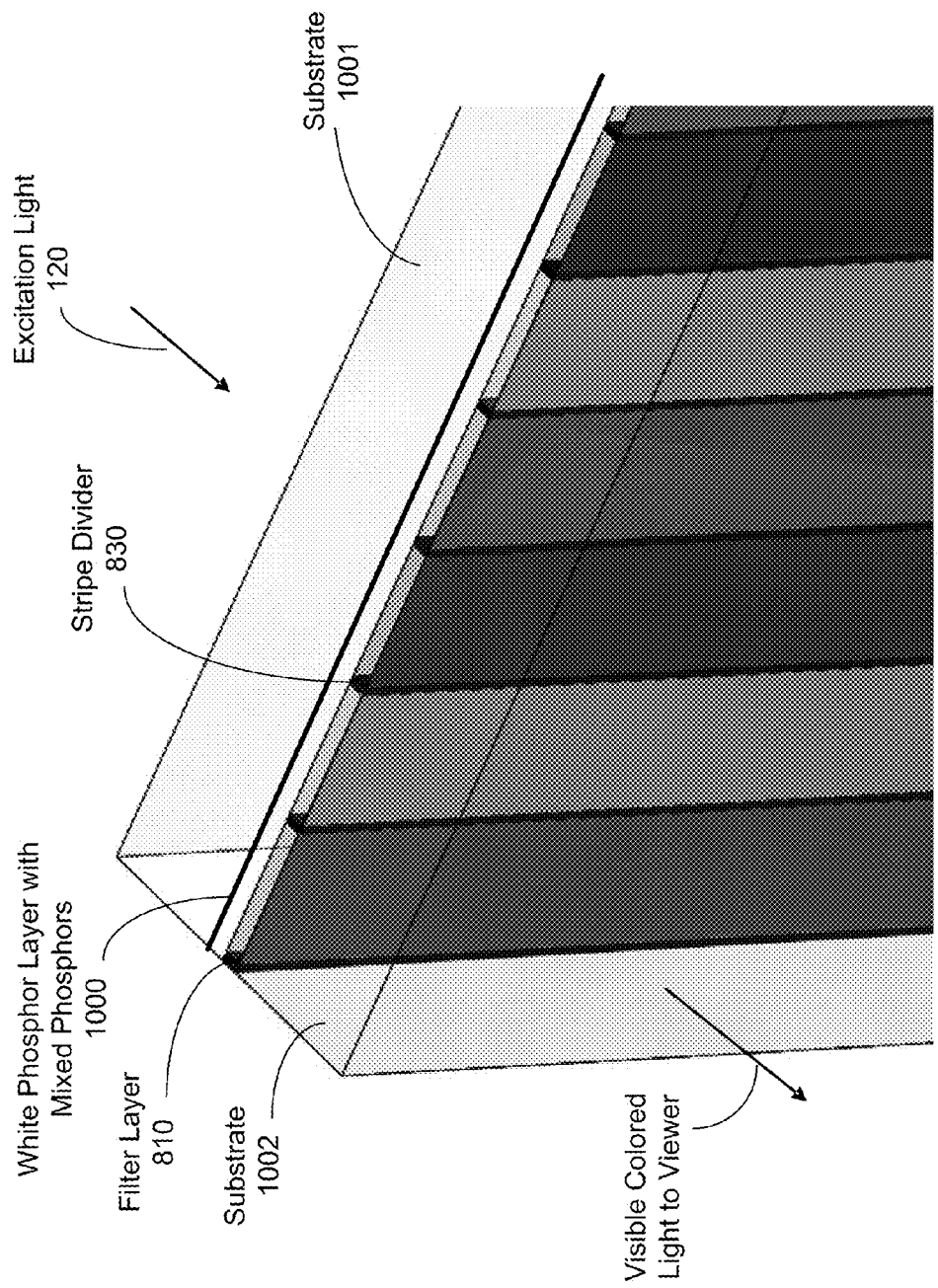
FIG. 10 illustrates an example of a fluorescent screen design that has a contiguous and uniform layer of mixed phosphors that emits white light.

FIG. 10 illustrates an example of a fluorescent screen design that has a contiguous and uniform layer 1000 of mixed phosphors. This mixed phosphor layer 1000 is designed and constructed to emit white light under optical excitation of excitation light. The mixed phosphors in the mixed phosphor layer 1000 can be designed in various ways and a number of compositions for the mixed phosphors that emit white light are known and documented. Other non-phosphor fluorescent materials that emit white light can also e used for the layer 1000. As illustrated, a layer 810 of color filters, such as stripes of red-transmitting, green-transmitting and blue-transmitting filters, is placed on the viewer side of the mixed phosphor layer 1000 to filter the white light and to produce colored output towards the viewer. In this example, the layers 1000 and 810 are sandwiched between substrates 1001 and 1002. The color filters in the layer 810 may be implemented in various configurations, including in designs similar to the color filters used in color LCD panels. In each color filter region e.g., a red-transmitting filter, the filter transmits the red light and absorbs light of other colors including green light and blue light. Two adjacent color filters may be separated by a divider 830 such as a reflective or absorbent separator 404.

The screen structure in FIG. 10 is simpler than other screen designs with different fluorescent stripes because the mixed phosphor layer 1000 in FIG. 10 is a contiguous layer without striped spatial structures. This construction avoids alignment issues associated with aligning the filters in layer 810 with respective fluorescent stripes in the layer 820 in FIG. 8. The substrate 1001 receives the excitation light and thus can be made of a material transparent to the excitation light, e.g., violet or UV light. The substrate 1002 faces the viewer and can be made of a material transparent to the colored light filtered by the filters in the layer 810. In fabrication, the layer 810 can be fabricated on the substrate 1002 and the layer 1000 can be fabricated on the substrate 1001. The two substrates 1001 and 1002 can be engaged to each other to form the screen. At the output surface of the second substrate 1002, an anti-reflection coating (AR) may be formed to improve the light transmission to the viewer. In addition, a hard protection layer may be formed over the second substrate 102 to protect the screen surface.

The excitation beam 120 in the above described systems can enter the fluorescent layer of the screen at a varying angle during a scan. The scanning causes the incident angle of the excitation beam 120 to the screen to change during each horizontal scan across different positions on the screen. For some screen constructions, the efficiency of the screens may be sensitive to the incident direction of the excitation beam 120 and some screen designs prefer the direction of the excitation beam 120 to be close to the normal direction to achieve a high efficiency of coupling the excitation light into the fluorescent layer. In one implementation for controlling the incident angle of the excitation beam 120 to the fluorescent layer, an optical mechanism may be implemented at the entry to the screen, e.g., the entrance layer 411 in FIG. 4, to direct the incident excitation beam 120 to be normal or approximately normal to the screen. One example of the entrance layer 411 is a Fresnel lens layer.

Figure 11:
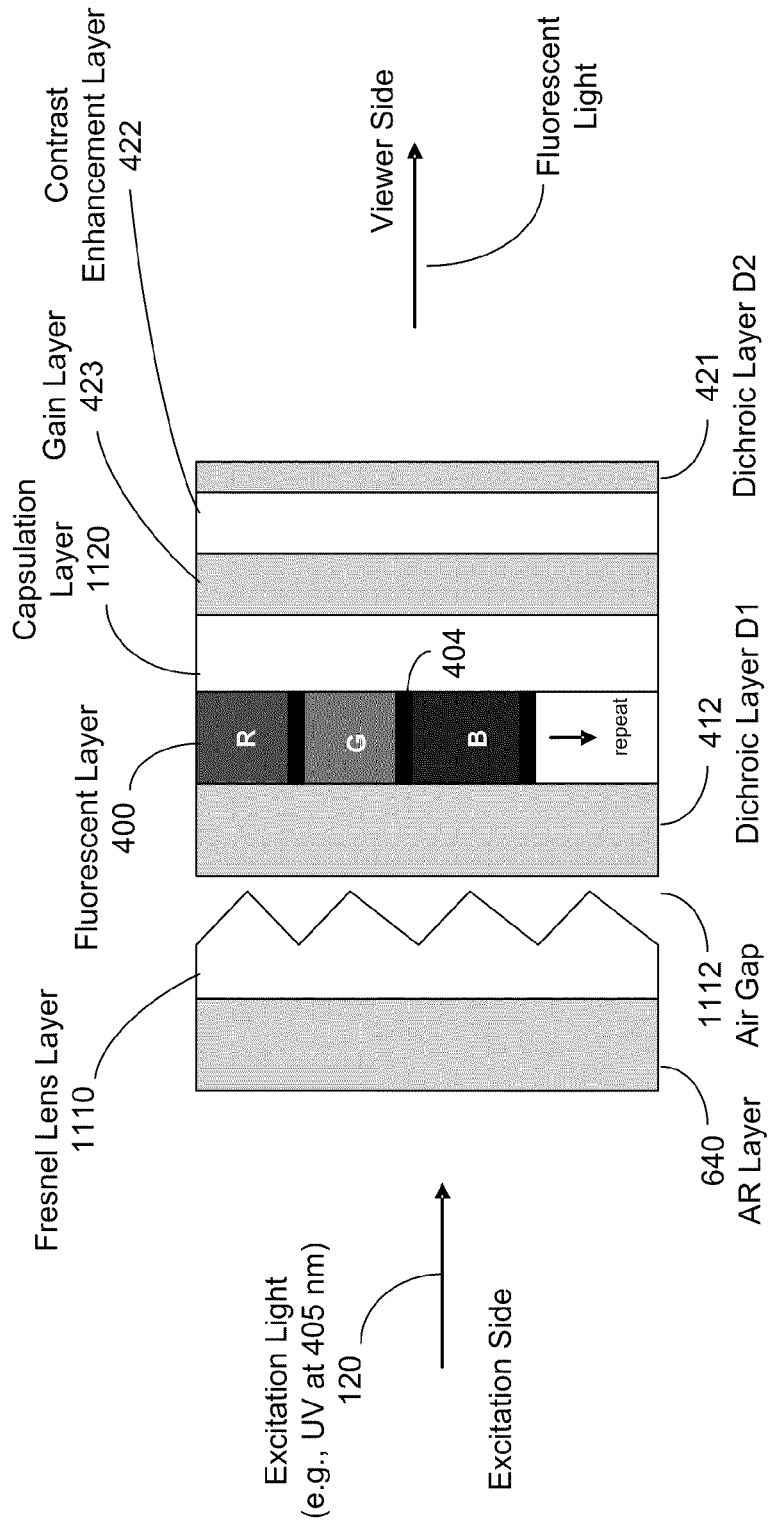
FIGS. 11 and 12 show a fluorescent screen design with a Fresnel lens layer to direct scanning input excitation light to the fluorescent screen.

FIG. 11 shows an example of a screen with a Fresnel lens layer 1110 formed at the entry side of the screen to cover the entire area of the screen that receives the excitation beam 120. The Fresnel lens layer 1110 can be formed in a dielectric substrate that may be made of, e.g., a glass or a plastic material. An acrylic plastic material, for example, may be used to form the Fresnel lens layer 1110. A dielectric layer 1112 with a different index than the Fresnel lens layer 1110 can be formed between the Fresnel lens layer 1110 and the remaining portion of the screen to create a difference in the refractive index from the Fresnel lens layer 1110 to the next layer of the screen, e.g., the first dichroic layer 412. The layer 1112 can be an air gap or a dielectric material transparent to the excitation light. The remaining portion of the screen includes the fluorescent layer 400 and other layers of the screen. A dichroic filter layer (D1) 412 on the excitation side of the fluorescent layer 400 can be implemented. In addition, an encapsulation layer 1120, a screen gain layer 423, a contrast enhancement layer 422, and a second dichroic layer D2 421 (a UV blocker) may also be provided in the screen. An anti-reflection layer 640 can be formed on the entrance surface of the Fresnel lens layer 1110 for receiving the excitation beam 120 with a minimized loss due to reflection.

In some implementations of the screen in FIG. 11, the first dichroic layer 421 (D1) can be designed to transmit light from 405 nm to 410 nm with a transmission of about 99.75% and to reflect visible light from 440 nm to 410 nm with a reflectivity of about 95%; the anti-reflection layer 640 can be designed to transmit UV light at 405 nm with a transmission of about 99.75%. The screen gain layer 423 can be designed to optically enhance the brightness and enlarge the viewing angle of the screen and may include a lenticular layer with lens elements, a diffractive optic layer of diffractive elements, a holographic layer with holographic elements, or a combination of these and other structures. The contrast enhancing layer 422 can include a color-selective absorbing pigment or dye supported in a base medium or matrix in each subpixel to absorb ambient light and to transmit light in the color of that subpixel. The spatial order of the encapsulation layer 1120, the screen gain layer 423, the contrast enhancement layer 422 and the UV-blocking dichroic layer 421 (D2) may vary with screen designs.

Figure 12:
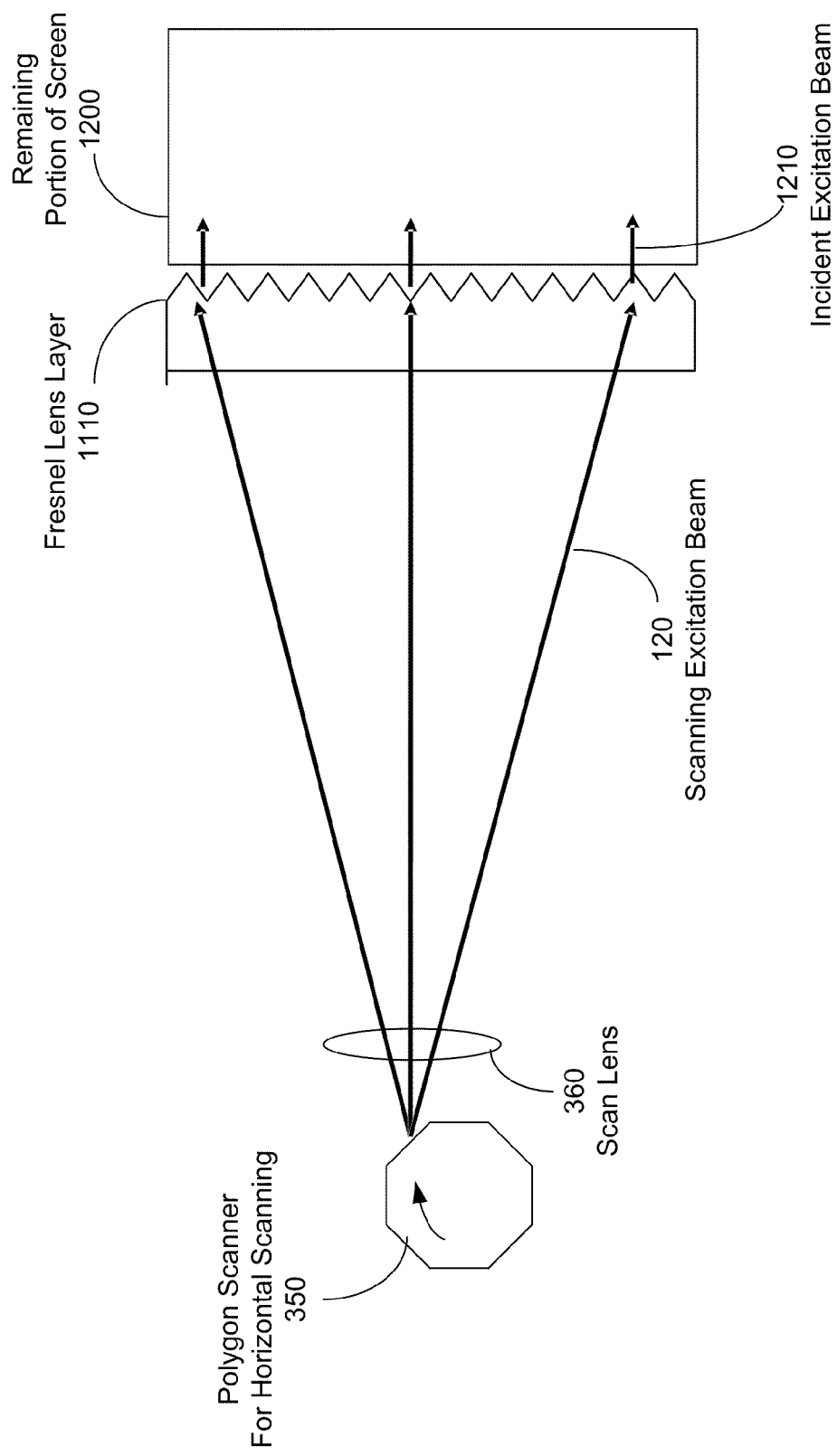

FIG. 12 illustrates the operation of the Fresnel lens layer 1110 in FIG. 11. The Fresnel lens layer 1110 has Fresnel rings and can be configured to redirect the incident scanning excitation beam 120 via optical diffraction, refraction or both as the incident excitation beam 1210 that is approximately normal to the screen. The Fresnel lens layer 1110 can be in a telecentric configuration for the incident scanning excitation beam 120.

The above Fresnel lens layer 1110 controls the incident direction of the excitation beam 120 into the remaining portion 1220 of the screen. Once the excitation beam 120 enters the screen, the excitation light should be fully utilized to excite the fluorescent layer and to generate visible light for displaying images to the viewer. Inside the screen, a portion of the excitation light can be redirected back towards the excitation side of the screen due to scattering and reflection by various surfaces and other screen structures within the screen. Such scattered and reflected excitation light should be recycled by directing it back to the fluorescent layer. In addition, a portion of the emitted visible light from the fluorescent layer can also propagate towards the excitation side of the screen and would cause loss of the image brightness if not being redirected to the viewer.

The entrance layer 411 in FIG. 4 can include a prismatic layer to reflect backward propagating excitation light and visible light, that propagates towards the entrance layer from the fluorescent layer, back to the fluorescent layer. Such a prismatic layer has parallel periodic prism stripes with apexes of a predetermined apex angle (e.g., 90 degrees) to form angled facets to direct the received excitation beam 120 into the screen by refraction. Each apex has two opposing angled facets that refract and reflect light and hence parallel rays in a common incident direction are refracted or reflected into two groups of parallel rays into two directions away from each other. The prismatic layer reflects light in various directions propagating from the fluorescent layer of the screen towards the prismatic layer back to the fluorescent layer by reflection at the angled facets including the total internal reflection for rays at incident angles into the angled facets greater than the critical angle for the total internal reflection angle. The reflected excitation light is recycled back to the fluorescent layer to further excite the fluorescent layer and thus the utilization of the excitation light for generating the visible fluorescent light is enhanced. In addition, the fluorescent light propagating towards the prismatic layer is also reflected towards the fluorescent layer and the viewer to enhance the brightness of the screen perceived by the viewer.

Figure 13:
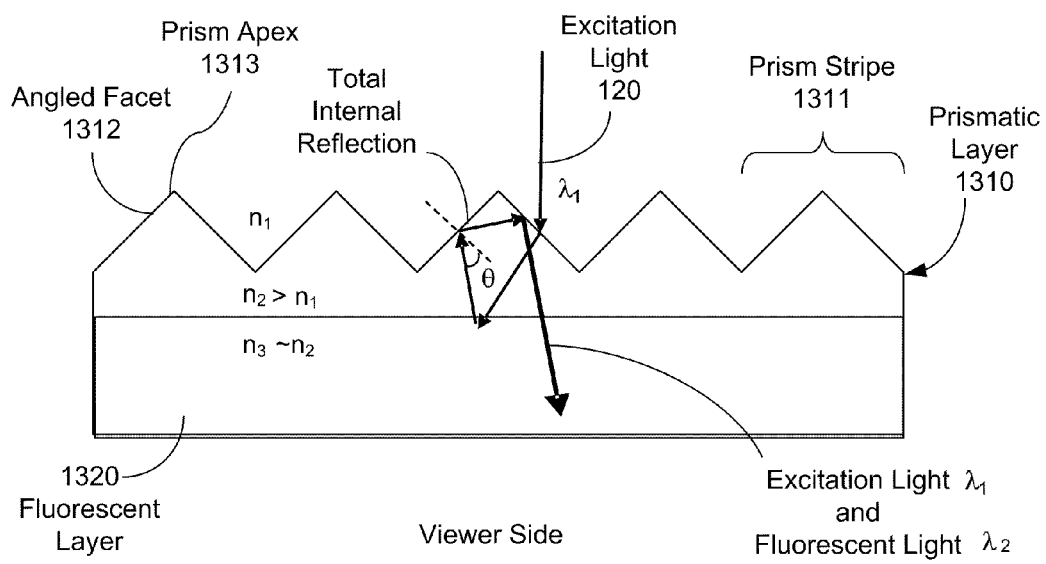
FIG. 13 shows a prismatic layer as an entrance layer for scanning excitation light in a fluorescent screen.

FIG. 13 shows one implementation of a fluorescent screen having a prismatic layer 1310 and an adjacent screen layer 1320 within the screen. The screen layer 1320 can be a fluorescent layer as shown and can be another layer on the excitation side of the fluorescent layer. The prismatic layer 1310 includes an array of prism elements 1311, e.g., an array of prism stripes having angled facets 1312 with an apex angle at 90 degrees. The angled facets 1312 are used to receive the excitation light 120. The width of each prism stripe can be greater than the wavelength of the excitation light and can be less than the width of each fluorescent stripe, i.e., the width of one subpixel of the screen. A cross sectional view is shown in FIG. 13 where the parallel prism stripes are perpendicular to the cross section.

The prismatic layer 1310 can be aligned to place the prism stripes parallel to the fluorescent stripes in the fluorescent layer 1320 in a parallel configuration or perpendicular to the fluorescent stripes in a cross configuration. In each prism stripe, the two angled facets 1312, which intersect with each other at the prism apex 1313, refract or reflect light parallel rays into two groups of parallel rays into two different directions in a plane perpendicular to the prism stripes. In the cross configuration, the two split beams that are split from the excitation beam 120 are directed to two locations within the same fluorescent stripe and hence does not cause spatial spreading of the excitation light along a direction perpendicular to the fluorescent stripes. As a result, the cross configuration can be used to prevent light of the excitation beam 120 from entering two adjacent fluorescent stripes at the same time. Recall that the excitation beam 120 is turned on to illuminate one fluorescent stripe to address one subpixel at a time. When a portion of an optical pulse in the excitation beam 120 intended to address one fluorescent stripe is split by the prism stripe and is directed to an adjacent fluorescent stripe, a cross talk between two adjacent subpixel occurs and can lead to degradation in color purity and image resolution. This can occur when the prismatic layer 1310 is in the parallel configuration where the splitting of the excitation beam 120 by each prism stripe is along the direction perpendicular to the fluorescent stripes. In the parallel configuration, the visible fluorescent light generated in one fluorescent stripe that propagates towards the prismatic layer 1310 can also have a higher probability of being reflected by the angled prim facets into an adjacent fluorescent stripe.

Figure 13A:
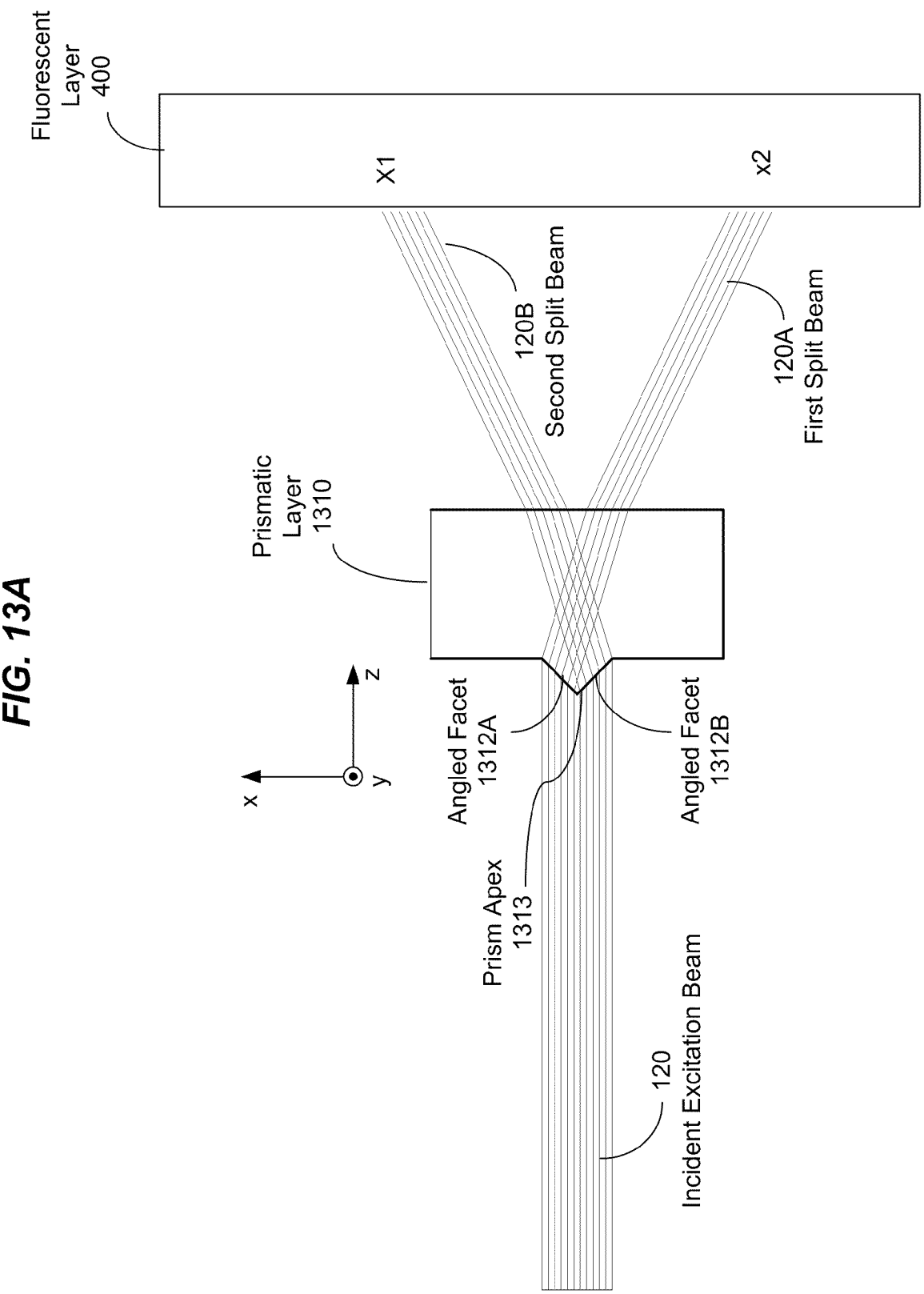
FIG. 13A illustrates an operation of the prismatic layer in FIG. 13.

FIG. 13A shows operation of a prism stripe 1311 of the prismatic layer 1310 in coupling the excitation beam 120 into the screen. The two angled facets 1312 are separated identified as facets 1312A and 1312B which interest at the apex 1313. In the xyz coordinate shown, the prism stripe is placed to be parallel to the y direction. The excitation beam 120, shown in a normal incidence to the prismatic layer 1310, is split by the facets 1312A and 1312B as two beams 120A and 120B, respectively. The two beams in the two different directions arrive the fluorescent layer 400 at two different locations x1 and x2 along the x direction. This feature of the prism stripe creates double imaging. Hence, in the cross configuration where the prism stripes are along the y direction and the fluorescent stripes in the fluorescent layer 400 are in the x direction, the locations x1 and x2 are two different locations along the longitudinal direction of the fluorescent stripe and thus are the same fluorescent stripe. In the parallel configuration where the prism stripes and the fluorescent stripes are parallel and are all along the y direction, the two locations x1 and x2 are separated from each other along the direction perpendicular to the longitudinal direction of a fluorescent stripe and thus can fall in two adjacent fluorescent stripes. The amount of the separation between the two beams 120A and 120B at the fluorescent layer 400 depends on the thickness of the prismatic layer 1310 and the distance between the fluorescent layer 200 and the prismatic layer 1310. Both alignment configurations for the prismatic layer 1310 can be used and the cross configuration may be preferred in some screen designs. In either configuration, the thickness of the prismatic layer can be minimized to minimize the effect of the double imaging of the prism stripe on the fluorescent layer.

The prismatic layer 1310 can be formed in a dielectric layer that is transparent to the excitation light 120 and has a refractive index n2 greater than the refractive index n1 of the transparent material above the angled facets 1312. The material above the angled facets 1312 can be air or a low-index transparent material. The material for the prismatic layer 1310 is selected to have a large refractive index n2 so that a small critical angle $\theta_{cr}=\arcsin(n_1/n_2)$ for the total internal reflection (TIR) is achieved at the angled facets 1312. The angled facets 1312 is used to receive the excitation light 120.

Depending on the screen designs, the screen layer next to the prismatic layer 1310 can be selected from various layers, e.g., an air gap, a low index layer with a lower refractive index than that of the prismatic layer, or a high index layer with a higher refractive index than that of the prismatic layer. In the specific example illustrated in FIG. 13, behind the prismatic layer 1310 is a layer 1320 that has a refractive index n3 that is approximately equal to the refractive index of the prismatic layer 1310. The index matching condition reduces undesired optical reflection at the interface between the prismatic layer 1310 and the layer 1320 and thus reduces the optical loss of the excitation light 120. The layer 1320 can be a dielectric layer that is transparent to excitation light 120 and is located between the prismatic layer 1310 and the fluorescent layer of the screen. The layer 1320 can also be the fluorescent layer which is formed by a layer of a binder material in which the fluorescent particles are embedded.

In operation, the scanning excitation light 120 is refracted by the angled facets when entering the prismatic layer 1310 and the refracted excitation light enters the screen to excite the fluorescent layer which generates visible fluorescent light to display images. A portion of the excitation light that is not absorbed and a portion of the fluorescent light can propagate towards the prismatic layer 1310. Although such light in all angles is reflected by the angled facets, a portion of such light can be totally reflected back into the screen at the angled facets by the total internal reflection (TIR) for rays with incident angles greater than the TIR critical angle. The reflected excitation light is thus recycled by interacting with the phosphor layer again and causing the phosphor to radiate the fluorescent light. The reflected fluorescent light is scattered by the phosphor, a portion of which exits from the viewing side. Thus, the prismatic layer 1310 improves utilization of the excitation light and enhances the brightness on the viewing side of the phosphor screen.

Notably, the prism apex angle and the index of the prismatic layer 1310 can be selected so that backward propagating light rays at or near the normal incidence to the screen have incident angles at each angled facet 1312 that are at or greater than the TIR critical angle for that angled facet 1312. Light ray 1341 as shown is one example of such a ray and is totally reflected at a respect angled facet 1312. The normal direction for each angled facet 1312 is different from the normal direction of the screen and forms an angle with the normal direction of the screen by one half of the prism apex angle. Light ray 1342 as shown is incident to an angled facet 1312 at an angle around one half of the prism apex angle with respect to the normal direction of the screen plane and thus is near the normal incidence for that angled facet 1312. This light ray 1342 thus is partially reflected and the rest of the light transmits through the prismatic layer. The transmitted portion of the light ray 1342 is lost and represents the loss for the screen. As a result, the prismatic layer 1310 can totally reflect backward propagating light rays incident at a wide range of angles, including light rays at the normal incidence to the screen and large angles. Light rays incident to the prismatic layer 1310 around the one half of the prism apex angle, however, are not totally reflected and are only partially reflected.

Figure 14:
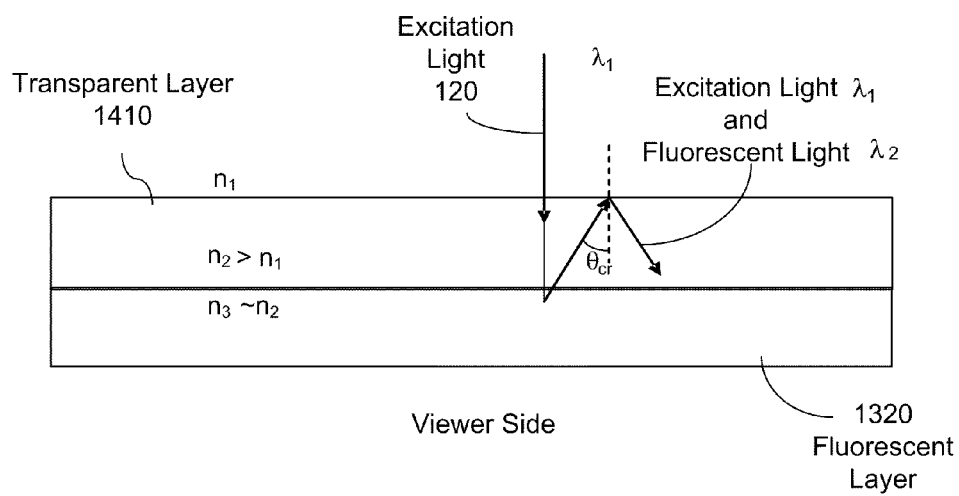
FIG. 14 shows a high-index layer as an entrance layer for scanning excitation light in a fluorescent screen.

The entrance layer 411 can be implemented by using a flat layer formed of a high-index material n2 that is transparent to the excitation light 120 in lieu of the prismatic layer 1310. FIG. 14 shows an example high-index layer 1410. The substrate or rigid layer 630 in FIG. 6 is also an example of such an entrance layer. The entrance surface of the layer 1410 is flat and the reflection at the entrance surface 1412 including the TIR can direct both backward propagating excitation light and the fluorescent light back into the screen to recycle the excitation light and to "push" more fluorescent light to the viewer side of the screen. This function of the flat high-index layer 1410 is similar to the prismatic layer 1310. The index n2 of the flat layer 1410 should be as high as possible to make the TIR critical angle at the entrance surface 1412 as small as possible to increase the total reflection. Different from the prismatic layer 1310, the normal direction of the entrance surface 1412 is the normal direction of the screen and thus light rays incident at or near the normal incidence to the screen with incident angles less than the TIR critical angle at the surface 1412 are partially reflected and partially transmitted. Light rays with incident angles with respect to the normal incidence of the screen greater than the TIR critical angle are totally reflected. In certain implementations of the prismatic layer 1310 in FIG. 13 or the high-index layer 1410 in FIG. 14 as an entrance layer to the screen, the index-matched layer 1320 next to the layer 1310 or 1410 may be replaced by a low index layer with an index less than the player 1310 or 1410, such as an air gap or a low-index dielectric layer.

The above prismatic layer 1310 and the high-index layer 1410 have different TIR properties, including different angular responses in reflecting light incident at different angles. Hence, the prismatic layer 1310 in FIG. 13 and the high-index layer 1410 in FIG. 14 may be combined together on the excitation side of the fluorescent layer to increase the optical throughput of the screen. In one implementation, the prismatic layer 1310 in FIG. 13 and the high-index layer 1410 in FIG. 14 may be spaced from each other by an air gap or a low-index layer as the entrance layer for the screen. The prismatic layer 1310 reflects light at small incident angles via the total internal reflection while the high-index layer 14109 reflects light at large incident angles via the internal total reflection. For example, the layers 1310 and 1410 can be used as part of the entrance layer and are spaced from each other by a low index layer or an air gap. The prismatic layer 1310 can be the first layer to receive the excitation beam 120 which transmits through the air gap or low-index layer into the layer 1410 or the layer 1410 can be the first layer to receive the excitation beam 120 which transmits through the air gap or low-index layer into the prismatic layer 1310. The surface 1412 of the layer 1410 is designed to have an TIR critical angle that is less than the TIR critical angle for each angled facet 1312 of the prismatic layer 1310 so that light rays that are partially reflected by the prismatic layer 1310 are totally reflected by the layer 1410. Under this configuration, the light rays at or near the formal direction of the screen that are not totally reflected by the layer 1410 are totally reflected by the prismatic layer 1310. Therefore, this combination of the layers 1310 and 1410 effectuates the function of the dichroic layer (D1) 412. The dichroic layer (D1) 412, when implemented by a multilayer structure as an interference filter, may be sensitive to incident angles where the dichroic function can be performed to light rays at or near the normal incidence or within a limited angular range for the incidence angles. The above combination of layers 1310 and 1410 is not sensitive to the incident angles and reflect backward propagating light at all angles. In addition, the spectral properties of a multilayer interference dichroic filter can be limited and can vary with the incident angles of the beams. The above combination of layers 1310 and 1410 is essentially free of such performance limitations of the a multilayer interference dichroic filter.

Fluorescent screens can be designed to combine the second dichroic layer 421 (D2) on the other side of the fluorescent layer, the prismatic layer 1310 or the high-index layer 1410 and the second dichroic layer 421 (D2) to confine a significant amount of the excitation light to bounce back and forth through the fluorescent layer between the prismatic layer 1310 (or the high-index layer 1410) and the second dichroic layer 421 (D2) to improve the utilization of the excitation light and the amount of generated fluorescent light.

The following sections now describe some specific fluorescent screen designs that implement selected screen elements described above.

Figure 15:
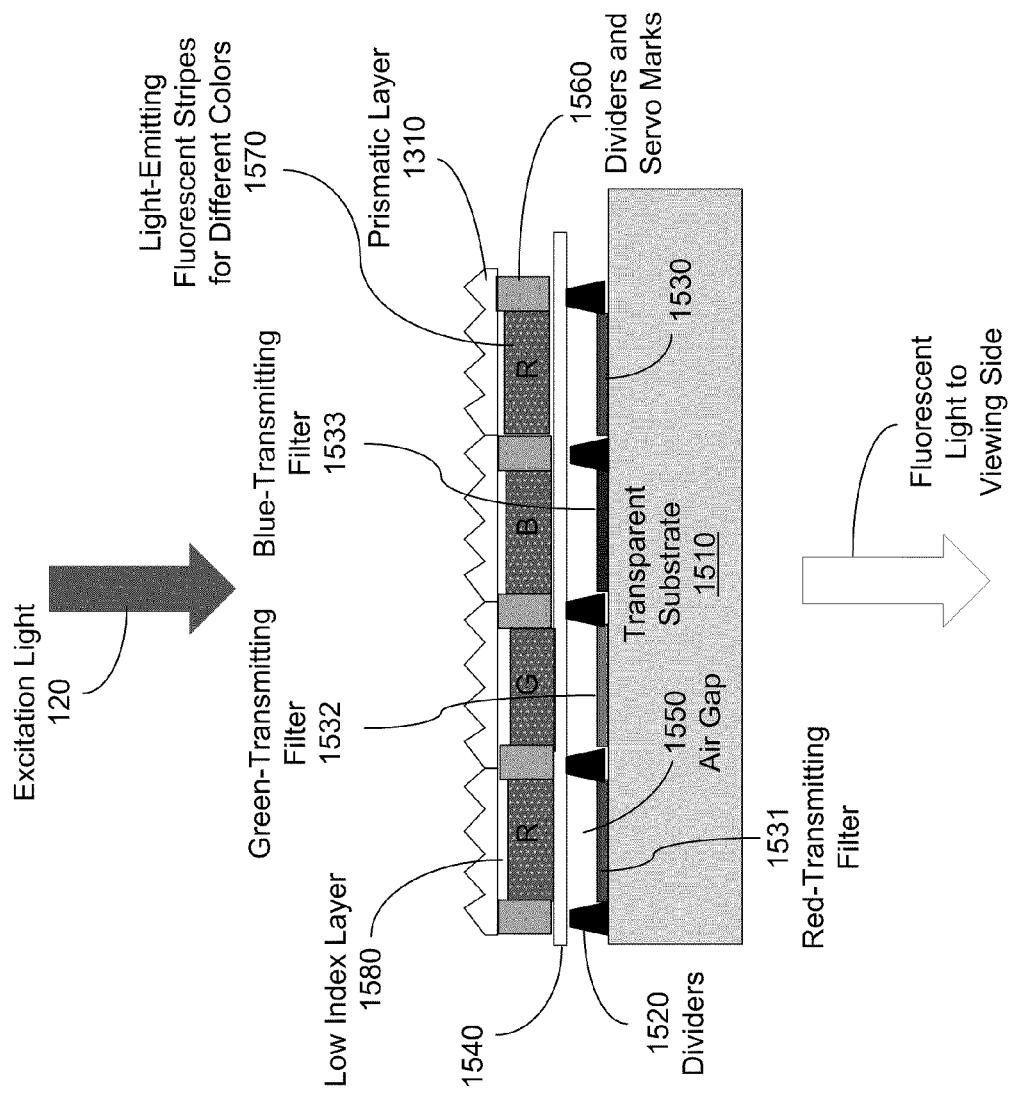
FIGS. 15, 16, 17, 18, 19, 20, 21, 22, 23, 24 and 25 show various screen designs.

FIG. 15 shows a multilayered fluorescent screen that implements a prismatic layer 1310 to couple excitation light into a fluorescent layer 1570. The screen includes a transparent substrate 1510 that faces the viewer side and transmits the colored light carrying images to the viewer. An array of opaque subpixel stripe dividers 1520 are formed on one surface of the transparent substrate 1510 to define the fluorescent stripes and optically separate adjacent or neighboring fluorescent stripes (i.e., adjacent subpixels). The stripe dividers 1520 may be made of a solid opaque film resist, an ink material printed on the substrate 1510, or an optical reflective or absorbent material. Between the stripe dividers 1520 are contrast enhancement color filters 1530 shaped as parallel stripes where three adjacent filers transmit three different designated colors, respectively, and absorb light of other colors different from their designated colors. Three adjacent filters 1531, 1532 and 1533 are examples for the filters 1530, where the filter 1531 is a red-transmitting filter that absorbs light of green and blue, the filter 1532 is a green-transmitting filter that absorbs light of red and blue, and the filter 1533 is a blue-transmitting filter that absorbs light of green and red. The operation and effect of the filters 1530 in combination with the fluorescent layer 1570 having fluorescent stripes emitting different fluorescent colors are described with reference to FIG. 8.

The screen in FIG. 15 includes a dielectric layer 1540 formed above and are supported by stripe dividers 1520 and below the fluorescent layer 1570. The dielectric layer 1540 and the filters 1530 are spaced apart by a low-index layer or an air gap 1550 which has an index less than that of the dielectric layer 1540. The height of the stripe dividers 1520 can be used to control the thickness of the low-index layer or the air gap 1550 which may be 10 to 50 microns. In some implementations, the dielectric layer 1540 can be a transparent material with a refractive index less than that of the fluorescent layer 1570 such as a clear PET plastic layer of about 50 microns. In other implementations, the dielectric layer 1540 can be a dichroic layer (D2) that transmits visible light and reflects the excitation light at a UV or violet wavelength. may be formed on top of the array of the stripe dividers and below the fluorescent layer.

The fluorescent layer 1570 in FIG. 15 can be repetitive different parallel fluorescent stripes for emitting different fluorescent colors (e.g., red, green and blue) and is formed over the layer 1540. Spatially corresponding to the opaque subpixel stripe dividers 1520, a second array of stripe dividers 1560 are formed on the layer 1540 to physically separate different fluorescent stripes 1570 so that each of the fluorescent stripe 1570 is aligned with a respective filter 1530.

The stripe dividers 1560 can be made from an optical reflective or diffusive material to direct at least part of the incident excitation light 120 back to the excitation side of the screen to be received by one or more servo photodetectors for a servo control of the display system. The power of the reflected excitation light produced by the stripe dividers 1560 varies with the position of the beam on a fluorescent stripe and thus can be used to determine a relative position of the excitation beam 120 on the fluorescent stripe and can be used to control the optical alignment between the excitation beam 120 and respective fluorescent stripes during a horizontal scan. In this context, the stripe dividers 1560 function as servo marks and are reflective at least at their facets facing the excitation side of the screen. The stripe dividers 1560 can also be made to include an IR-emitting fluorescent material or other fluorescent material emitting light at a wavelength different from the excitation light 120 and the visible light emitted by the fluorescent layer 1570 that is excited by the same excitation laser light 120 for the fluorescent layer 1570. Such fluorescent stripe dividers 1560 can be used to improve the detection signal to noise ratio at the one or more servo photodetectors because scattered excitation light and the visible fluorescent light generated by the fluorescent layer 1570 can be filtered out to allow only the IR light to be detected by the one or more servo photodetectors for the servo control operation. Details of the stripe dividers 1560 as servo stripe marks and the servo control are described in a separate patent application.

On top of the fluorescent layer 1570 in FIG. 56, the prismatic layer 1310 is formed to transmit the excitation laser light in the UV or violet range and to reflect light, both the excitation light and the fluorescent light, from the fluorescent layer 1570. Hence, the prismatic layer 1310 effectuates the function of the dichroic layer 412 (D1) described above for reducing loss of the fluorescent light to the excitation side of the screen. In addition, the prismatic layer 1310 also recycles the unabsorbed excitation light back to the fluorescent layer 1570.

Notably, between the prismatic layer 1310 and the fluorescent layer 1570, a low index transparent layer 1580 with an index less than that of the fluorescent layer 1570 is formed to increase the optical throughput of the screen. A polymer material or an air gap can be used as the second low index transparent layer 1580. Referring to preceding description for the prismatic layer 1310 in FIG. 13 and the flat high-index layer 1410 in FIG. 14, the layers 1310 and 1410 can be combined to effectuate total internal reflection to backward propagating rays at all angles. In FIG. 15, the fluorescent layer 1570 effectively provide the function of the high-index layer 1410 in FIG. 14. Backward propagating light rays at incident angles to the interface between the layers 1570 and 1580 greater than the TIR critical angle at this interface are totally reflected, including both the excitation light and the fluorescent light generated in the layer 1570. Backward propagating light rays with incident angles less than the TIR critical angle at this interface are partially reflected by the interface and partially transmit through the layer 1580 to enter the prismatic layer 1310. This portion of the backward propagating light is then totally reflected by the angles facets 1312 of the prismatic layer 1310.

Figure 16:
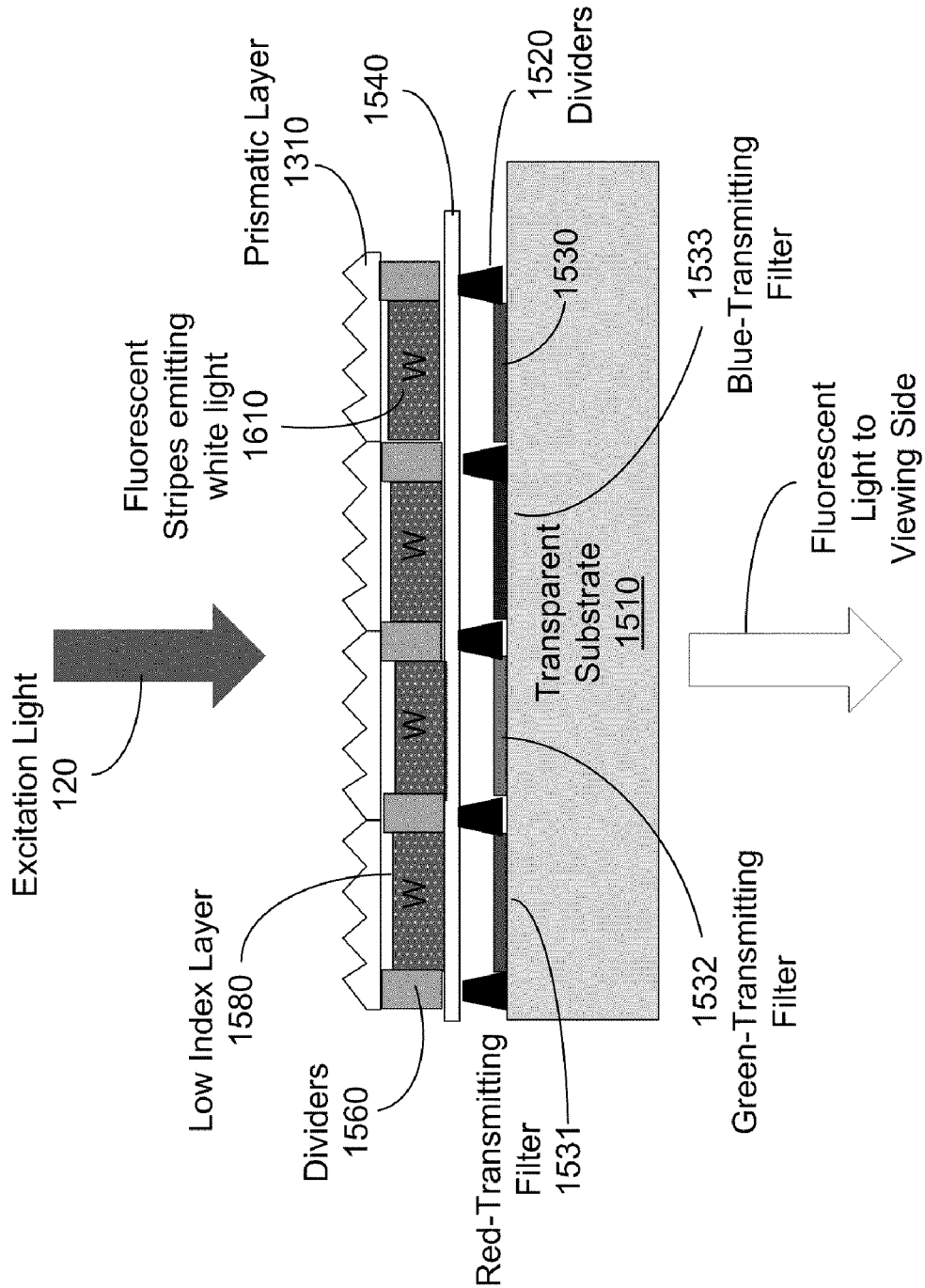

FIG. 16 illustrates another screen based on the design in FIG. 15 where a fluorescent layer 1610 of identical parallel stripes made of a single mixture of different phosphors that emits white light is used to replace the fluorescent layer 1570 with fluorescent stripes made of different fluorescent materials. The color generation is achieved by using the color filters 1530 based on the design in FIG. 10.

Figure 17:
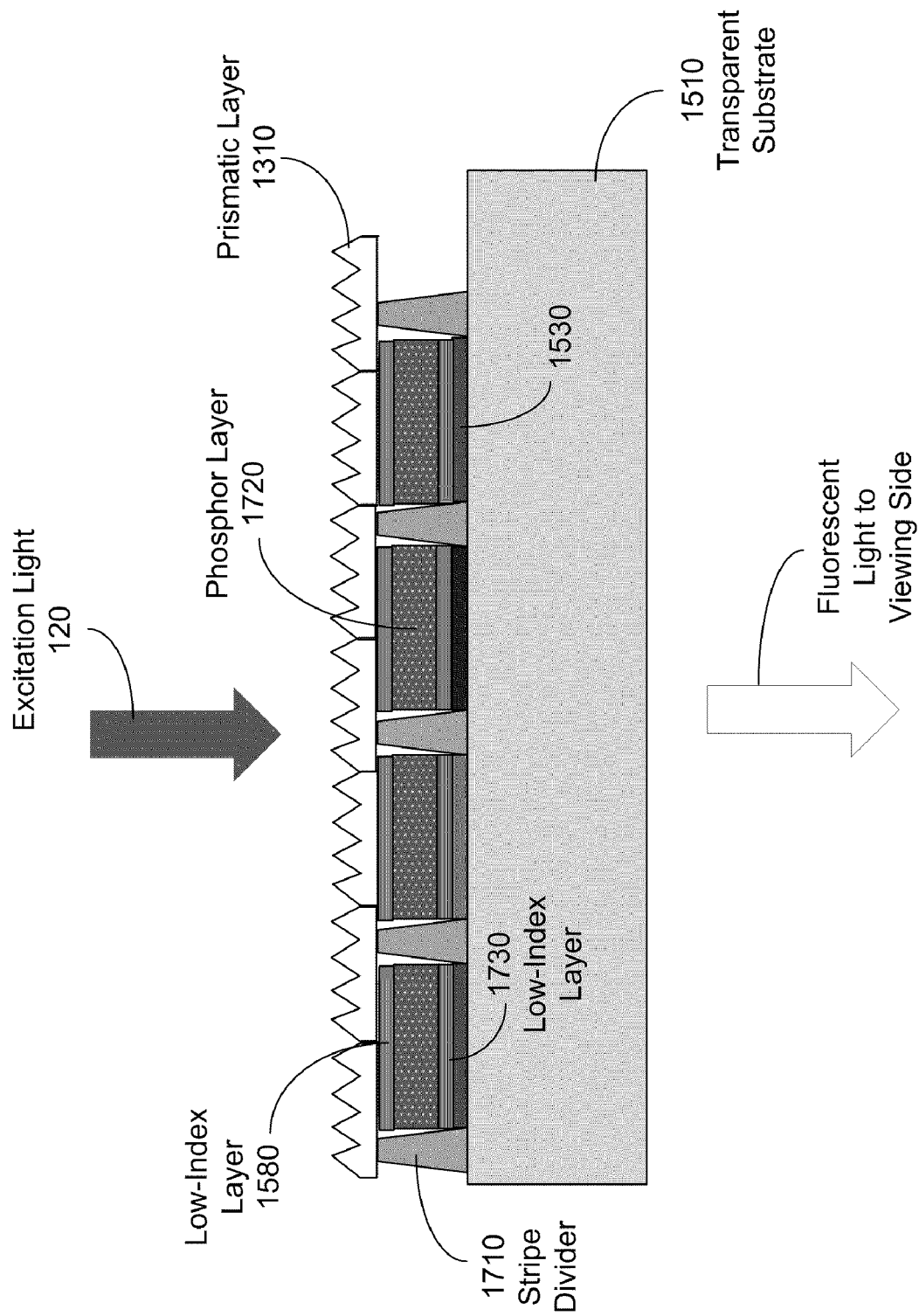

FIG. 17 shows another example of a screen design with the prismatic layer 1310 where a single array of stripe dividers 1710 are used to separate both the parallel stripe color filters 1530 and parallel fluorescent stripes 1720 made of a single white-light-emitting fluorescent material or different fluorescent materials emitting different colors. The separate array of stripe dividers 1560 as servo marks in the designs in FIGS. 15 and 16 is eliminated to simply the screen structure. The single array of stripe dividers 1710 is used as both stripe dividers and the servo marks and can be made of a material for the stripe dividers 1560. Different from the designs in FIGS. 15 and 16, this example uses a low index transparent layer 1730 formed between and in direct contact with each color filter 1530 and the fluorescent layer 1720. The low index transparent layer 1730 has a refractive index less than that of the fluorescent material to increase the optical throughput into each color filter 1530 of the screen with reduced optical loss caused by the total internal reflection at their interface. The layer 1730 may a gel layer that is sealed between the layers 1720 and 1730. A second low index transparent layer 1580 with an index less than that of the prismatic layer 1310 and the fluorescent material is formed between the prismatic layer 1310 and the fluorescent layer 1720 to increase the optical throughput of the screen. A polymer material or an air gap can be used as the second low index transparent layer 1580.

Figure 18:
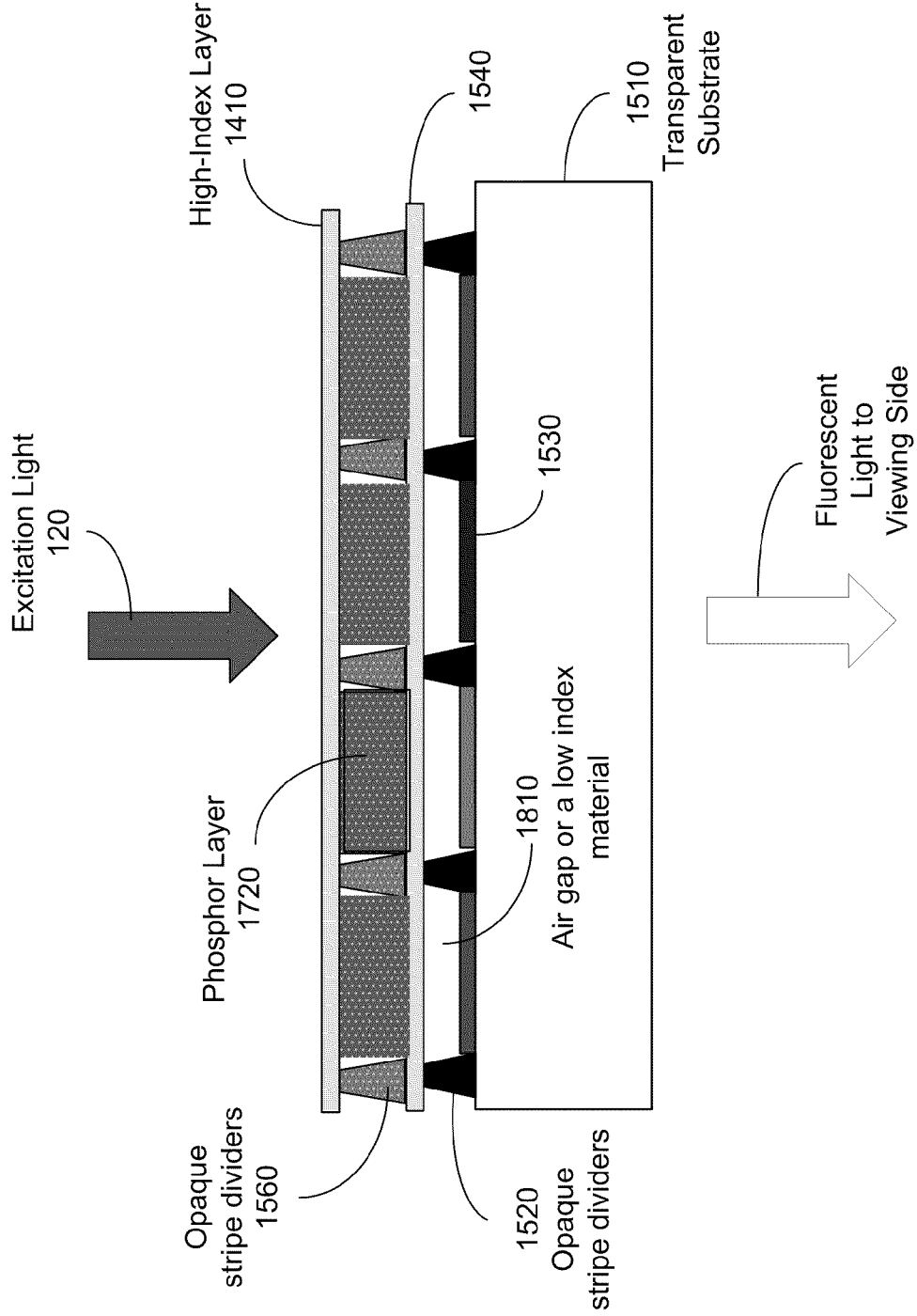
Figure 19:
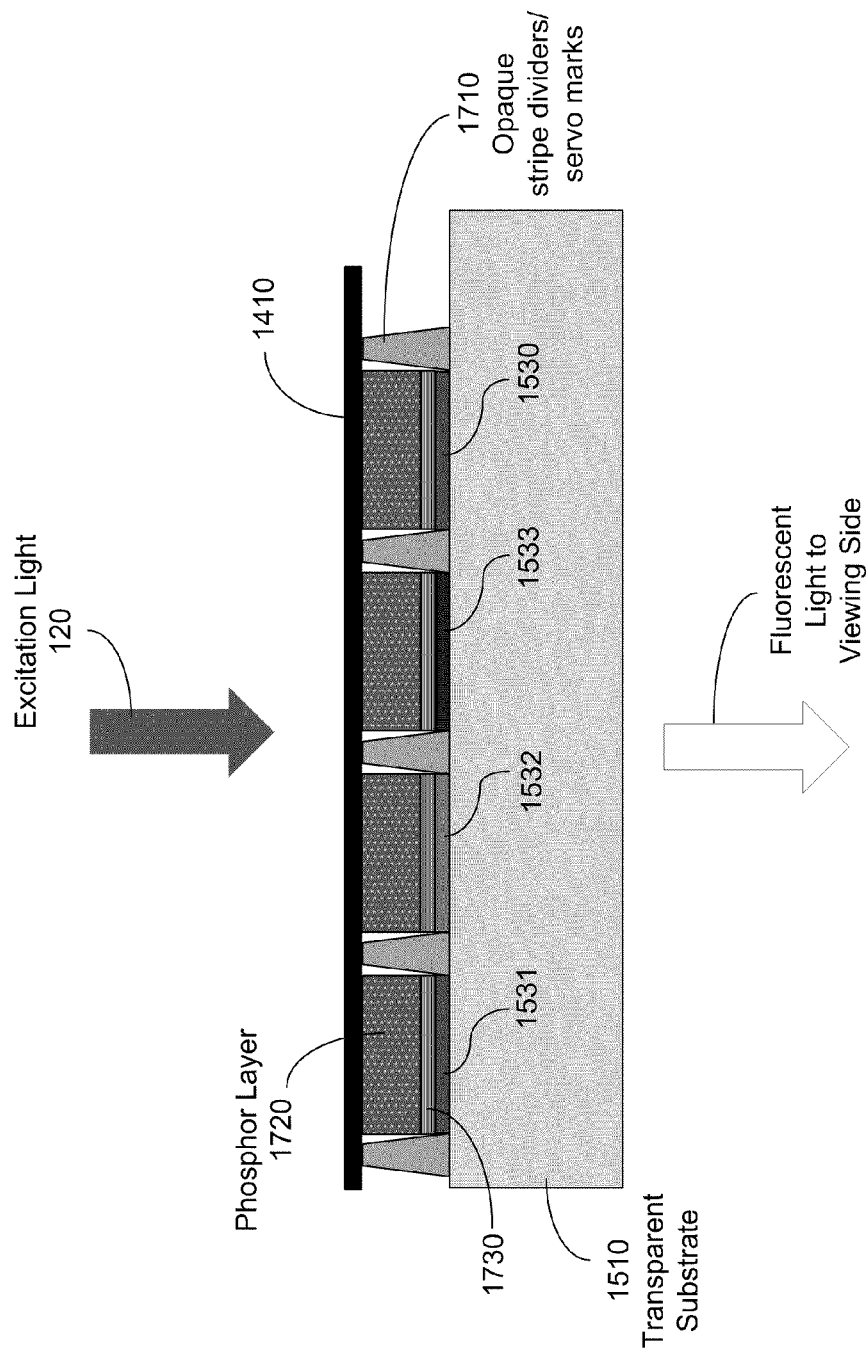

FIGS. 18 and 19 show two exemplary screens that use the high-index flat layer 1410 in FIG. 14 as the entrance layer for the screen. In FIG. 18, the screen is based on the screen structures in FIGS. 15 and 16 and uses the high index layer 1410 to replace the prismatic layer 1310 and the low index layer 1580. In FIG. 19, the screen is based on the screen structure in FIG. 17 and uses the high index layer 1410 to replace the prismatic layer 1310 and the low index layer 1580.

Figure 20:
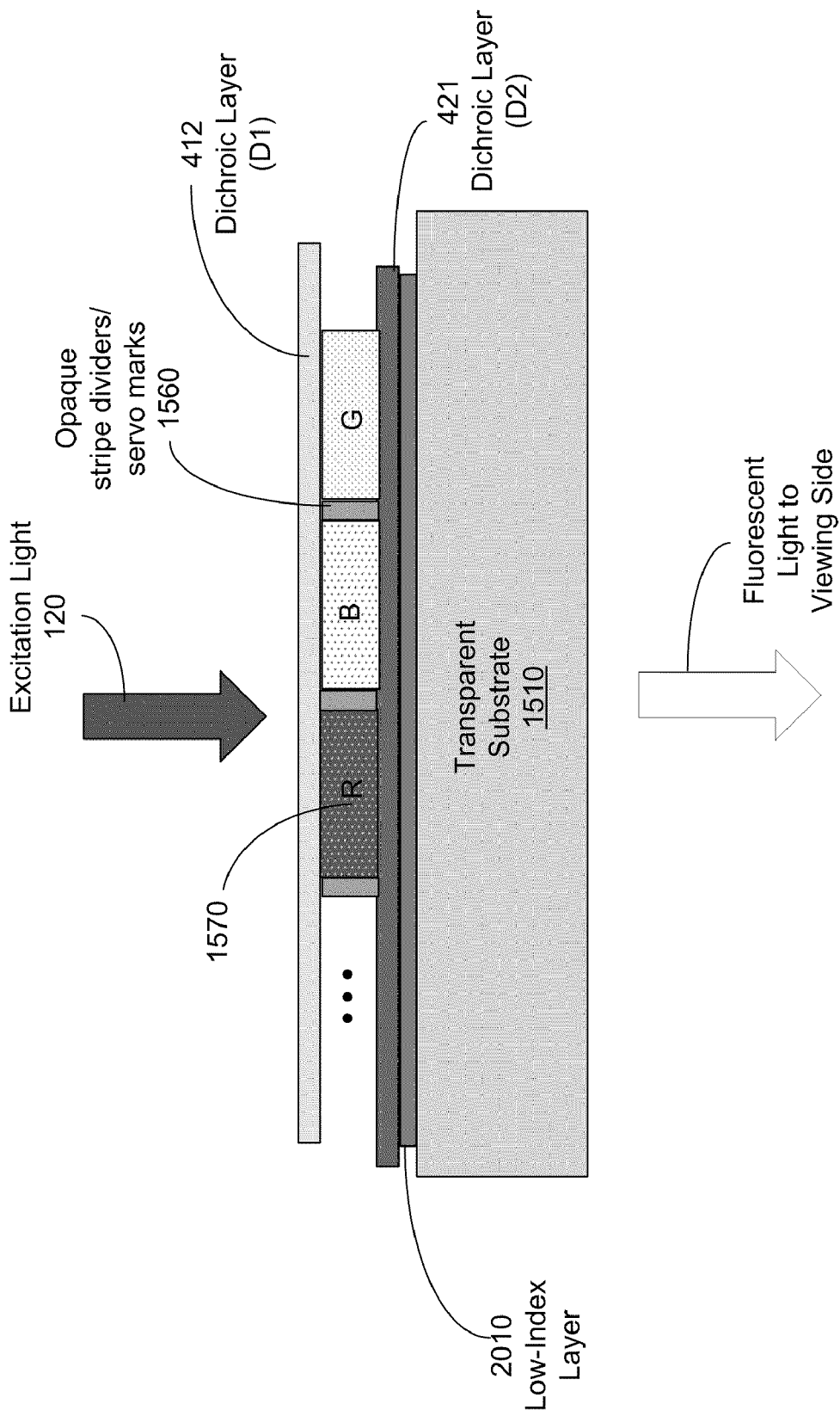

FIG. 20 shows a fluorescent screen design where the dichroic layers 412 (D1) and 421 (D2) are formed on two sides of the fluorescent layer 1720 based on the design in FIG. 4. A low index transparent layer 2010 is formed between the dichroic layer 421 and the substrate 1510 to improve the optical throughput to the viewer. An array of stripe dividers 1560 are formed to separate adjacent fluorescent stripes and to also operate as the servo marks for the above servo feedback control as described in FIG. 15.

Figure 21:
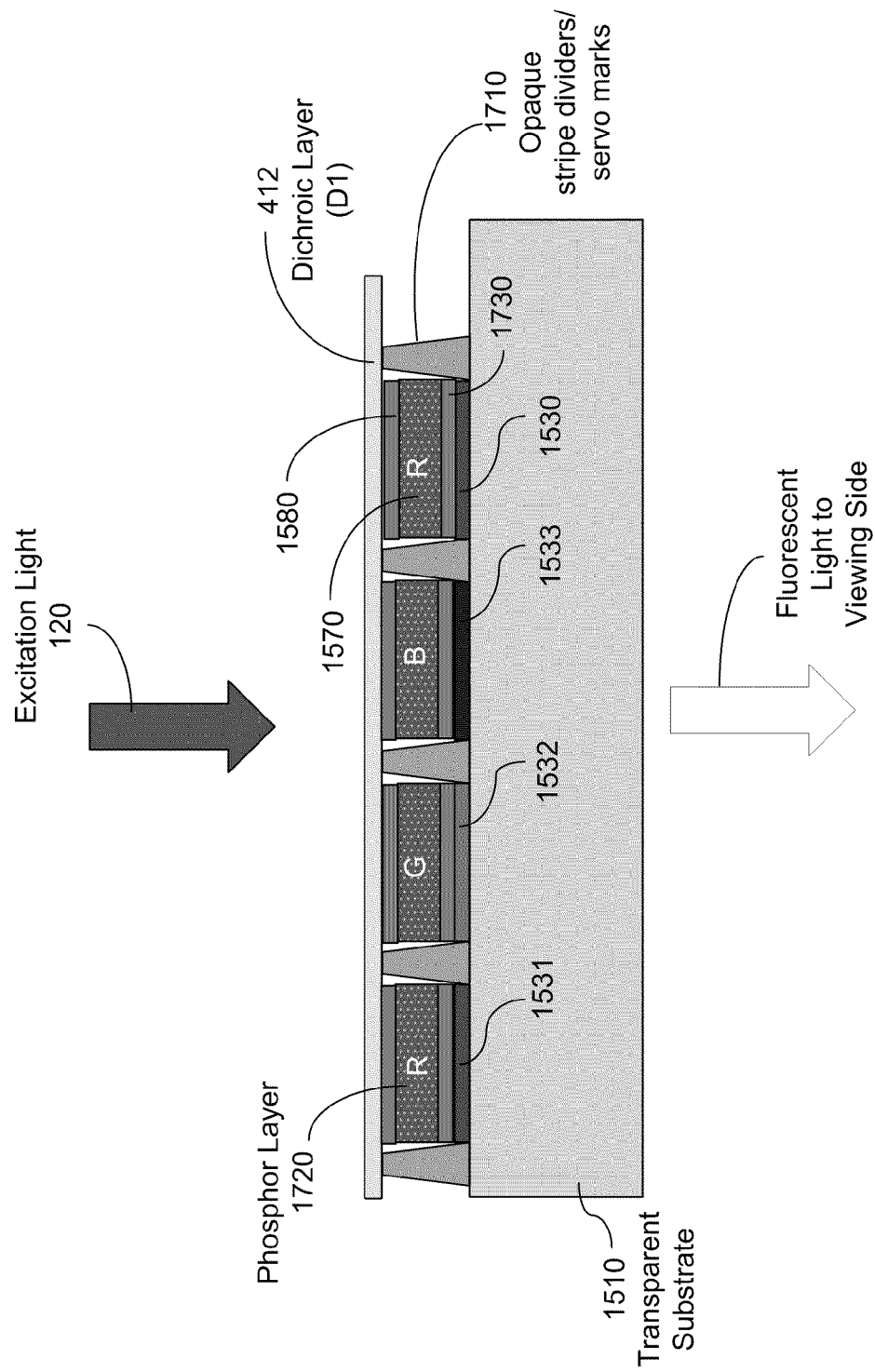

FIG. 21 shows a screen design based on the design in FIG. 17. A dichroic layers 412 (D1) that transmits the excitation light 120 and reflects fluorescent light emitted by the fluorescent layer 1720 is used to replace the prismatic layer 1310. Parallel fluorescent stripes 1720 can be made of a single white-light-emitting fluorescent material or different fluorescent materials emitting different colors. The stripe dividers 1710 are used to both physically separate adjacent fluorescent stripes and operate as servo marks for the above servo feedback control as described with reference to FIG. 15.

Figure 22:
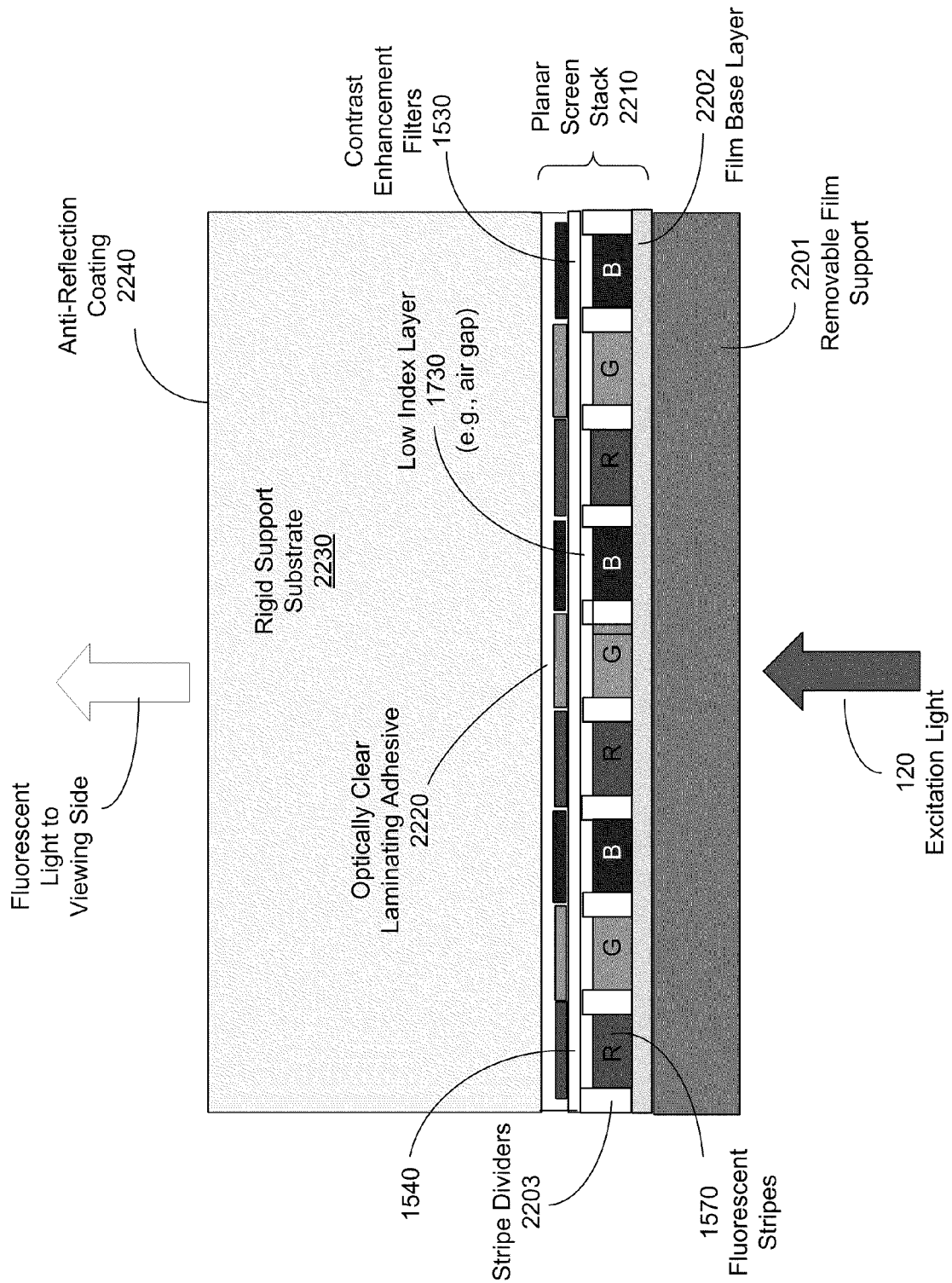

FIG. 22 shows another screen design based on the design in FIG. 14. A rigid support substrate 2230, such as a transparent plastic or glass material, is used as a base to support various screen layers with a planar screen stack 2210. An optical grad acrylic substrate, for example, can be used to form the substrate 2230. The planar screen stack 2210 includes a film base layer 2202 which operates as the high-index layer 1410 shown in FIG. 14 to couple light into the screen and to reflect light back into the screen based on total internal reflection. A polyester film, such as the commercially available DuPont Teijin film and Mylar DL film, can be used as the layer 2202. A filter support layer 2201, such as a protective liner, may be attached to the polyester film 2202. This support layer 2201 may be used to protect film base layer 2202 during the fabrication and can be removed after the screen is fully assembled. The support layer 2201 may also be retained after the fabrication as a protection layer. A layer 1570 of fluorescent stripes is formed in contact with the film base layer 2202 and are divided by stripe dividers 2203. The dividers 2203 are optically reflective at its facets or sidewalls in contact with the film base layer 2202 and the fluorescent stripes in the fluorescent layer 1570. A dielectric layer 1540 is formed above the stripe dividers 2203 and to form a space between the layer 1540 and the fluorescent layer 1570. This space can be an air gap or be filled with a low index layer 1730 with a refractive index less than that of the fluorescent regions in the fluorescent layer 1570. A contrast enhancement layer 1530 with different color filters is formed on the layer 1540. An adhesive layer 2220, e.g., an optically clear laminating adhesive, is used to adhere the planar screen stack 2210 to the substrate 2230. At the exit surface of the substrate 2230 that faces the viewer, an anti-reflection layer 2240 can be formed to reduce the glare of the screen due to reflection of ambient light.

Figure 23:
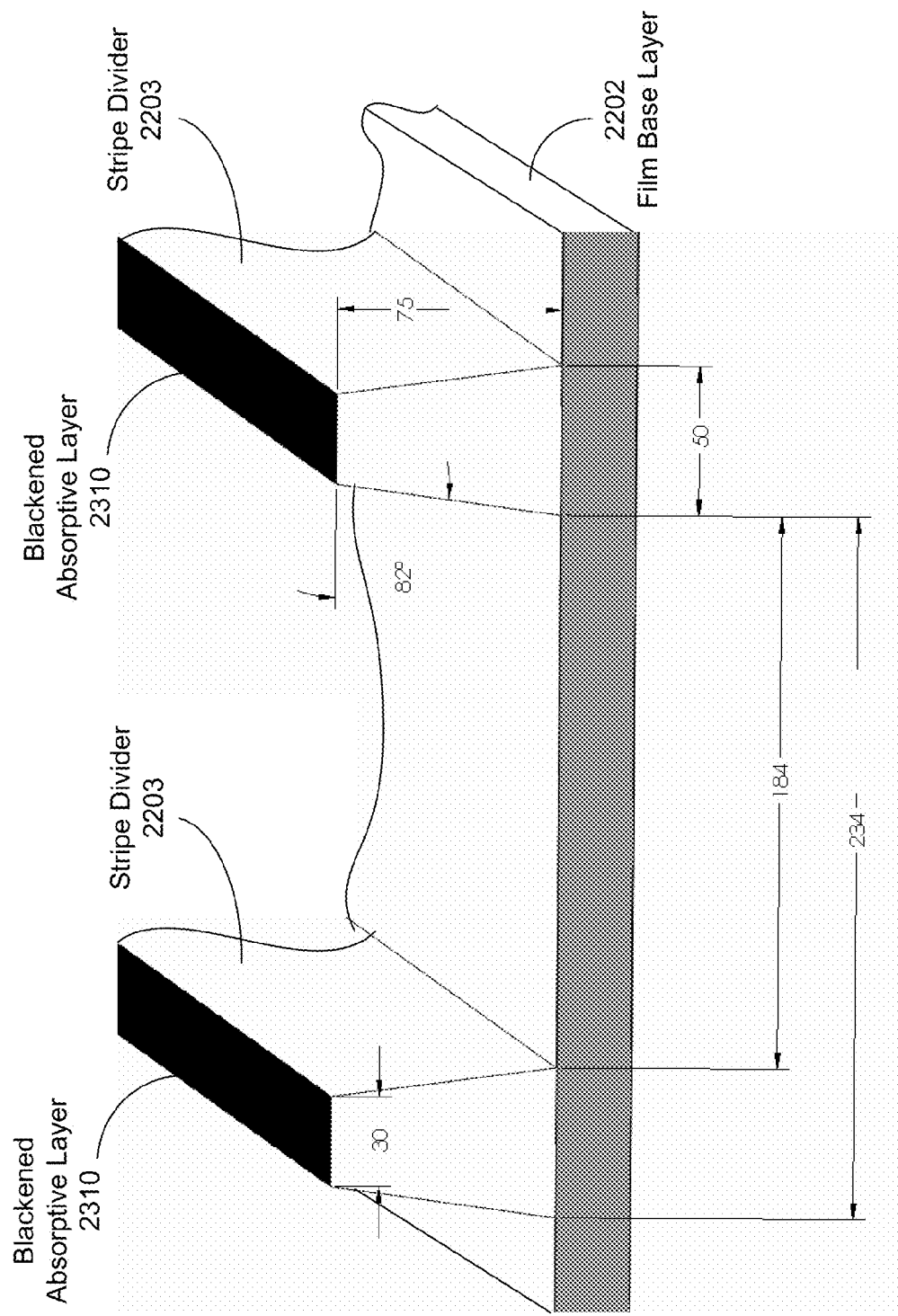

FIG. 23 shows details of the stripe dividers 2203 according to one implementation. All dimensions are in microns and are exemplary. The body of each divider 2202 is optically reflective and can be made of an optical reflective material. As an option, the divider facet that faces the viewer side of the screen can be coated with a blackened absorptive layer 2310 to reduce any reflection towards the viewer side, e.g., less than 10% in reflection and greater than 80% in absorption from 400 nm to 650 nm. This feature can enhance the resolution and contrast of the screen. Various optically reflective materials can be used to form the dividers 2203. Metal materials such as aluminum can be used to construct the dividers 2203 or as coating materials to form a coating on a surface or facet of each divider that needs to be reflective. In addition, a white paint material can also be used to form the dividers 2203 to achieve a high reflectivity. For example, a white paint made of a TiO2-filled resin or a barium sulfate-filled resin can be formulated to achieve superior reflective properties to metal coatings, especially when reflecting back into a clear polymer. The reflectivity of the white paint material can be grater than 90% from 400 nm to 650 nm.

Furthermore, the stripe dividers 2203 can also be made to include an IR-emitting fluorescent material or a fluorescent material emitting light at a wavelength different from the excitation light 120 and the visible light emitted by the fluorescent layer 1570 that is excited by the same excitation laser light 120 for the fluorescent layer 1570. Such fluorescent stripe dividers 2203 can be used to improve the detection signal to noise ratio at the one or more servo photodetectors because scattered excitation light and the visible fluorescent light generated by the fluorescent layer 1570 can be filtered out to allow only the IR light to be detected by the one or more servo photodetectors for the servo control operation. The facet on each divider 2203 facing the viewer side can be coated with the absorptive layer 2310.

Figure 24:
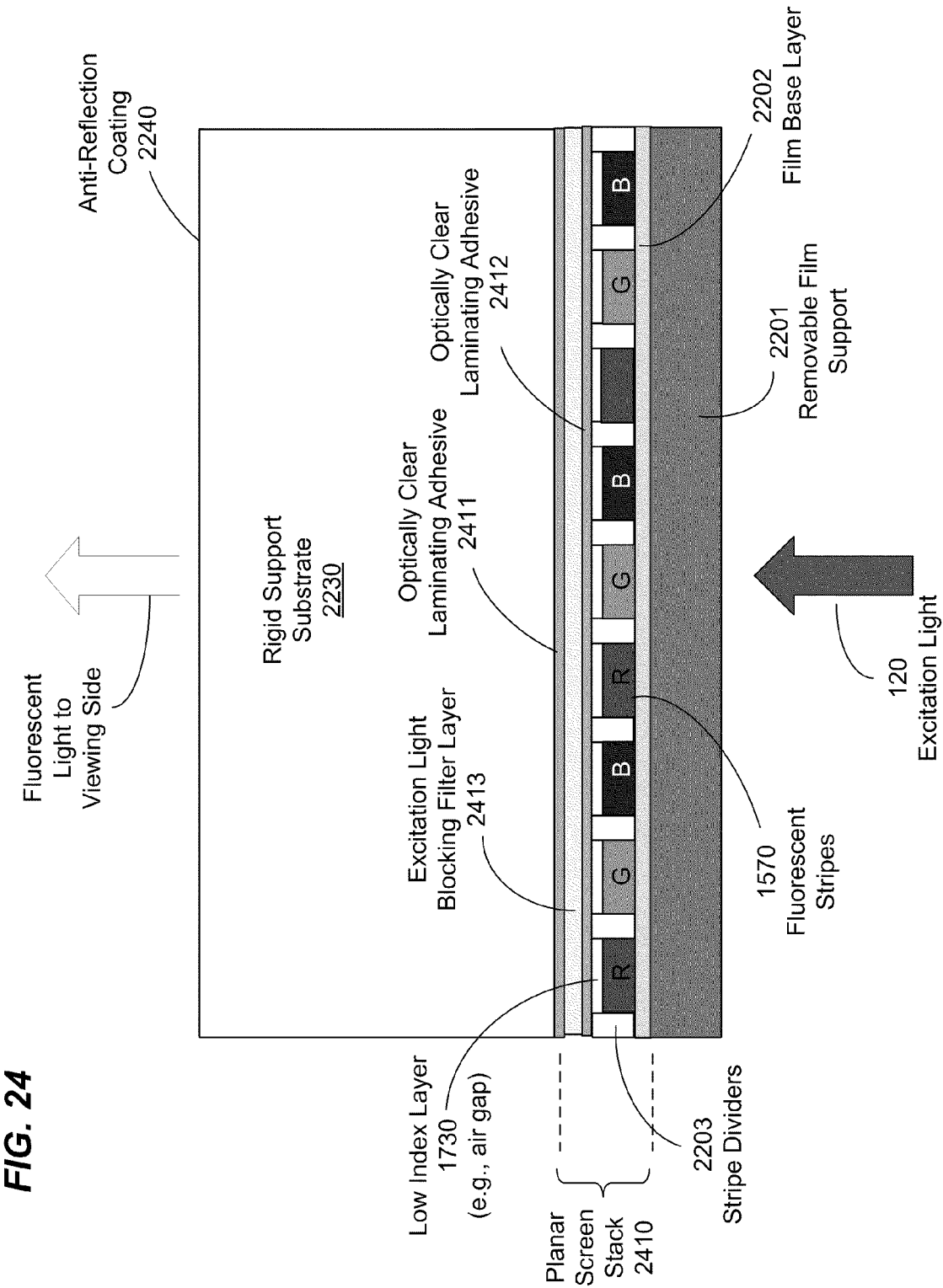
Figure 25:
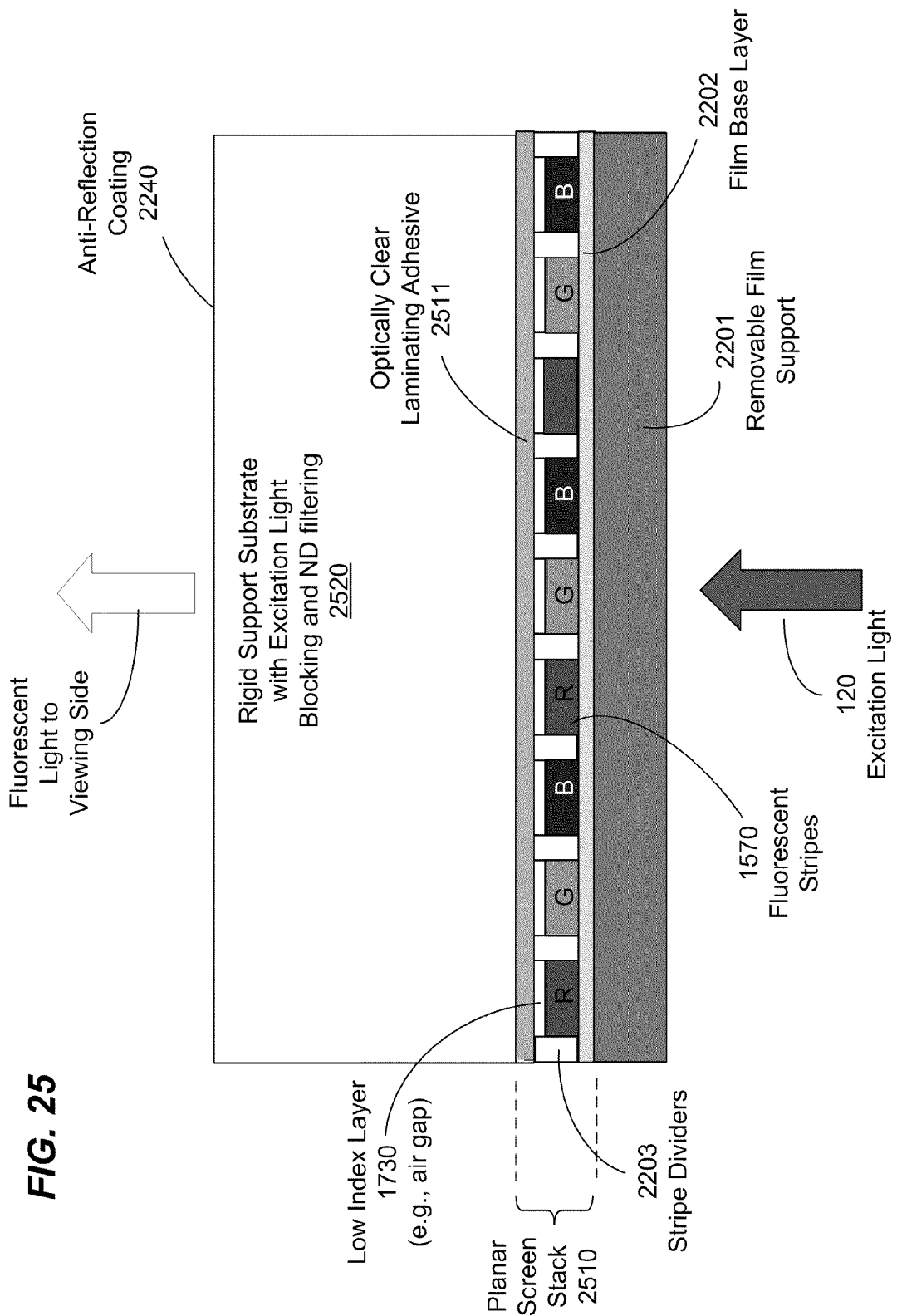

FIGS. 24 and 25 show two example screen designs that replace a color filter based contract enhancement layer with a filter layer that blocks the excitation light and uniformly attenuates visible light to enhance the display contrast. In FIG. 24, a planar screen stack 2410 replaces the stack 2210 in FIG. 22. The stack 2410 includes a filter layer 2413 which blocks excitation light (e.g., light between 400 nm and 415 nm) from transmitting to the viewer side and uniformly attenuates the visible light, e.g., from 430 nm to 670 nm, as an ND filter. A polyester film can be used as the filter layer 2413. Two optically clear laminating adhesive layers 2411 and 2412 are used to engage the filter layer 2412 to the stripe dividers 2203 on one side and to the substrate 2230 on the other side.

In FIG. 25, a rigid support substrate 2520 is used to provide the excitation blocking function and the ND filtering function of the filter layer 2413 in FIG. 24, thus eliminating the filter layer 2413. This simplifies the screen construction. The planar screen stack 2510 in this example includes a laminating adhesive layer 2511, the stripe dividers 2203, the fluorescent layer with fluorescent stripes 1570, the low index layer 1730 between the fluorescent layer and the laminating adhesive layer 2511 and the high-index film base layer 2202.

In some of the screen designs, one or more layers may be a contiguous layer across the fluorescent stripes without being divided into stripes by the stripe dividers. For example, the film base layer 2202 in FIGS. 22, 24 and 25, and the dielectric layer 1540 in FIGS. 15, 16, 18 and 22, the capsulation layer 1120, the gain layer 423 in FIGS. 4 and 11 and the high-index layer 1401 in FIGS. 14, 18, 22, 23, 24 and 25 are such a contiguous layer. In such a contiguous layer, emitted visible light from the fluorescent light can be reflected back and forth at the two surfaces of the contiguous layer and thus may be reflected into an adjacent subpixel to cause smear of images. In addition, excitation light targeted at one subpixel may also be reflected into an adjacent subpixel to excite a wrong color at the adjacent subpixel to cause a undesired halo effect. One way to reduce these adverse effects is to limit the thickness of such a contiguous layer to a value less than a width of a subpixel, e.g., 10 times less than the width of a subpixel along the horizontal direction that is perpendicular to the fluorescent stripes.

In the above screen designs, the colored fluorescent light emitted from the phosphor layer passes through various interfaces between two different layers or materials in the path towards the viewer. At each of such interfaces, a difference in the refractive indices at the two sides of the interface causes undesired reflection. In particular, the total internal reflection can occur at an interface when the emitted colored light propagates from a layer with an index higher than the next layer when the incident angle is greater than the critical angle of that interface. Therefore, in some implementations, the optical materials may be selected to have refractive indices as close as possible to minimize the reflection. In other implementations, a difference in refractive indices at an interface is intentionally created to achieve certain effects.

Figure 26:
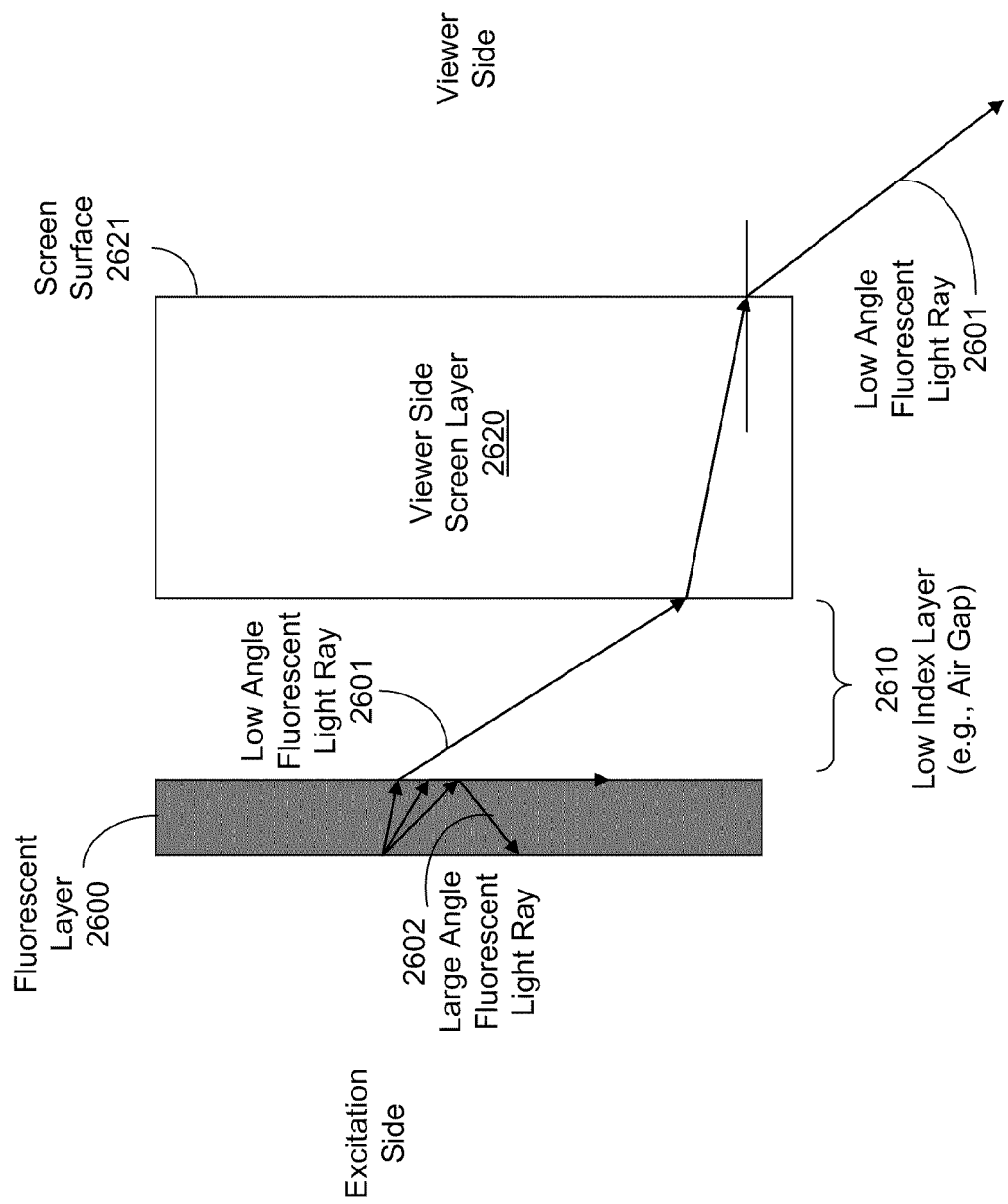
FIG. 26 shows an implementation of a low-index dielectric layer such as an air gap on the viewer side of the fluorescent layer in a fluorescent screen to improve the image quality of the fluorescent screen.

For example, the fluorescent layer in some of the fluorescent designs can have an adjacent low-index dielectric layer with a low refractive index on the viewer side of the fluorescent layer. The refractive index of the low-index dielectric layer is less than the index of the fluorescent layer and the index of another screen layer that is in contact with the low-index dielectric layer. FIG. 26 illustrates an example of this structure as part of a fluorescent screen. This example shows only a part of the screen to illustrate three consecutive screen layers of this structure: a fluorescent layer 2600, a low-index dielectric layer 2610 and a screen layer 2620 as the viewer-side outer layer of the screen. Fluorescent light emitted in the fluorescent layer 2600 can transmit through the low-index dielectric layer 2610 and the screen layer 2610 to exit the screen and to reach the viewer. The structure in FIG. 26 can use the low-index dielectric layer 2610 to increase the throughput of the fluorescent light from the fluorescent layer 2600 to the viewer side of the screen and to reduce cross talk between two adjacent fluorescent stripes in the fluorescent layer 2600 caused by reflection of the fluorescent light on the viewer side of the fluorescent layer 2600.

In this design, most of the fluorescent light propagating inside the fluorescent layer 2600 towards the layer 2610 partially transmits and is partially reflected at the interface 2601 between the layers 2600 and 2610. Because the index of the low-index dielectric layer 2610 is less than the fluorescent layer 2600, a portion of the fluorescent light that arrives at the interface an angle greater than the critical angle for the total internal reflection (TIR) is completely reflected back to the fluorescent layer 2600. Hence, the TIR condition creates an angular filtering function at the interface 2601 to allow transmission of fluorescent light with small incident angles less than that of the TIR critical angle and to block transmission of fluorescent light with larger incident angles. At the interface 2611 between the layers 2610 and 2620, there is no total internal reflection towards the layer 2610 because the index of the layer 2610 is less than that of the layer 2620. The fluorescent light at all angles partially transmits through the interface 2611 to enter the layer 2620 and is partially reflected back to the layer 2610. Because the TIR condition at the interface 2601 limits the angles of the fluorescent light entering the layer 2610 to be less than the TIR critical angle at the interface 2601, a fluorescent light ray 2632 in the layer 2620 that is the transmission of the light ray 2631 in the layer 2631 also has a maximum angle determined by the indices of the layers 2600, 2610 and 2620. The layer 2620 has an exit surface 2621 that is also the screen surface to interface the air. Accordingly, a total internal reflection can occur to light in the layer 2620 with an incident angle greater than the TIR critical angle at the interface 2621.

The TIR at the interface 2621, however, reduces the amount of fluorescent light that exits the screen towards the viewer. This reduces the screen brightness. In addition, the reflected light by the TIR at the interface 2621 may cause fluorescent light in one color generated by one fluorescent stripe to enter an adjacent fluorescent stripe of a different color and thus lead to cross talk between two adjacent fluorescent stripes. For example, the blue light from a blue fluorescent stripe can excite the red and green fluorescent stripes to emit light. When this cross talk occurs, a blue spot on the screen can cause glowing in adjacent red and green pixels, often known as an image halo. As a result, this TIR at the interface 2621 can cause degradation in color purity and the image resolution.

In recognition of at least the above, the indices of the layers 2600, 2610 and 2620 can be selected so that a fluorescent light ray 2630 in the fluorescent layer 2600 that originates the light ray 2631 in the layer 2610 and the light ray 2632 in the layer 2620, when at an incident angle equal to the TIR critical angle at the interface 2601, leads to the incident angle of the light ray 2632 at the exit surface 2621 of the layer 2620 to be no greater than the TIR critical angle at the interface 2621. Under this condition, the fluorescent light that transmits through the interface 2601 from the fluorescent layer 2600 into the low-index layer 2610 will not be totally reflected at the interface 2621. Notably, the low-index layer 2610 can be an air gap which has the lowest index or a dielectric material with a desired low index. This feature has been shown in some of the examples described above, including screens in FIGS. 15, 16, 18, 22, 24 and 25.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A display screen, comprising:
a fluorescent layer comprising a plurality of parallel fluorescent stripes, the fluorescent layer absorbing excitation light to emit visible light, wherein the excitation light and the visible light are of different wavelengths, and wherein adjacent fluorescent stripes in the plurality of parallel florescent stripes emit visible light of different colors and are separated by a respective stripe divider;
an entrance layer on a first side of the fluorescent layer to receive the excitation light and to direct the excitation light to the fluorescent layer;
a first filter layer on a second side of the fluorescent layer opposite to the first side, the first filter layer formed of a material that transmits the visible light and uniformly attenuates the visible light over a spectral range of the visible light; and
a dielectric layer in contact with each respective stripe divider separating a respective pair of adjacent florescent stripes in the plurality of parallel fluorescent stripes, wherein the dielectric layer is spaced from the fluorescent layer to define a gap between the dielectric layer and the fluorescent layer.

2. The display screen as in claim 1, wherein:
the first filter layer further blocks transmission of the excitation light.

3. The display screen of claim 1, wherein:
the first filter layer includes an optical neutral density filter that transmits and uniformly attenuates the visible light over the spectral range of the visible light.

4. The display screen as in claim 3, wherein:
the first filter layer further includes an excitation blocking layer that substantially blocks the excitation light.

5. The display screen as in claim 3, wherein:
the optical neutral density filter further blocks transmission of the excitation light.

6. The display screen as in claim 1, further comprising:
a second filter layer on the second side of the fluorescent layer opposite to the first side, the second filter layer blocking transmission of the excitation light and transmitting the visible light.

7. The display screen as in claim 1, wherein:
the entrance layer comprises a prismatic layer which includes a plurality of prism elements.

8. The display screen as in claim 1, wherein:
the entrance layer comprises a dielectric layer with a flat surface to receive the excitation light.

9. The display screen as in claim 1, wherein:
the entrance layer comprises a Fresnel lens layer.

10. The display screen as in claim 1, wherein:
the respective stripe divider has side walls that are reflective and opaque to the visible light emitted by the adjacent fluorescent stripes.

11. The display screen as in claim 10, wherein:
the respective stripe divider comprises a white paint that is optically reflective and opaque.

12. The display screen as in claim 1, wherein:
a first florescent stripe of the adjacent florescent stripes is of a first florescent material emitting visible light of a first color, and a second florescent stripe of the adjacent florescent stripes is of a second florescent material emitting visible light of a second color different from the first color.

13. The display screen as in claim 12, wherein:
the first florescent material and the second florescent material are different colored phosphors.

14. The display screen of claim 1, wherein:
the fluorescent layer includes a continuous florescent film that emits white light when excited by the excitation light;
the fluorescent layer further includes, on the second side of the fluorescent layer, a plurality of parallel, colored filter stripes located on the continuous florescent film; and
each of the plurality of parallel, colored filter stripes, in conjunction with a respective portion of the continuous fluorescent film that directly faces the colored filter stripe, forms a respective one of the plurality of parallel florescent stripes and emits visible light of a respective color.

15. The display screen of claim 14, wherein:
the continuous florescent film is made of a mixture of different colored phosphors.

16. The display screen of claim 1, wherein:
the respective stripe divider has an optically reflective side that faces the entrance layer and reflects the excitation light.

17. The display screen of claim 1, wherein:
the respective stripe divider has an optically absorbent side that faces the first filter layer and absorbs visible ambient light.

* * * * *